(12) United States Patent
Campau et al.

(10) Patent No.: US 11,496,921 B1
(45) Date of Patent: Nov. 8, 2022

(54) COMPUTER-BASED SYSTEMS CONFIGURED FOR MANAGING MESH NETWORKS HAVING INTEGRATED ROOFING COMPONENTS AND METHODS OF USE THEREOF

(71) Applicant: BMIC LLC, Dallas, TX (US)

(72) Inventors: Zachary Richard Campau, Novato, CA (US); Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/868,544

(22) Filed: Jul. 19, 2022

Related U.S. Application Data

(60) Provisional application No. 63/229,815, filed on Aug. 5, 2021.

(51) Int. Cl.
*H04W 28/02* (2009.01)
*H04L 12/28* (2006.01)
*H04W 84/18* (2009.01)

(52) U.S. Cl.
CPC ....... *H04W 28/021* (2013.01); *H04L 12/2807* (2013.01); *H04W 84/18* (2013.01)

(58) Field of Classification Search
CPC .. H04L 12/2807; H04W 28/021; H04W 84/18
See application file for complete search history.

(56) References Cited

U.S. PATENT DOCUMENTS

| | | | |
|---|---|---|---|
| 10,939,405 B1 | 3/2021 | Haleem et al. | |
| 2004/0114522 A1* | 6/2004 | Friesen | H04J 3/1617 370/241 |
| 2007/0219932 A1 | 9/2007 | Carroll et al. | |
| 2010/0085978 A1* | 4/2010 | Raman | H04L 41/5029 370/401 |
| 2010/0263660 A1 | 10/2010 | Thorne | |
| 2014/0282754 A1* | 9/2014 | Rehman | H04W 76/15 725/81 |
| 2016/0189319 A1 | 6/2016 | Jungerman et al. | |
| 2019/0208422 A1 | 7/2019 | Haleem et al. | |
| 2019/0295193 A1 | 9/2019 | Winand et al. | |
| 2019/0349434 A1 | 11/2019 | Haleem et al. | |

FOREIGN PATENT DOCUMENTS

| | | |
|---|---|---|
| AU | 2013204139 A1 | 5/2013 |
| EP | 2182654 A3 | 8/2011 |

* cited by examiner

*Primary Examiner* — Khoa Huynh

(74) *Attorney, Agent, or Firm* — Greenberg Traurig LLP

(57) ABSTRACT

Systems and methods of the present disclosure enable mesh network capacity management via network metering using a processor an integrated roofing mesh network node in a mesh network to receive and transmit data packets in the mesh network. Each data packet includes a source address, a destination address, and a payload of data. The processor determines passthrough traffic including a subset of data packets routed between radio nodes of the mesh network through the gateway based on the source address and the destination address of each data packet and an address associated with the gateway. The processor determines a passthrough data capacity based on the payload of each data packet in the subset and determines a metric based on the passthrough data capacity to signify an amount of mesh network bandwidth provided by the integrated roofing mesh network node.

20 Claims, 12 Drawing Sheets

COMPUTER-BASED SYSTEMS CONFIGURED FOR MANAGING MESH NETWORKS HAVING INTEGRATED ROOFING COMPONENTS AND METHODS OF USE THEREOF

CROSS-REFERENCE TO RELATED APPLICATIONS

The present application claims priority to U.S. Provisional Application 63/229,815, filed on Aug. 5, 2021, which is incorporated herein by reference in its entirety.

FIELD OF TECHNOLOGY

The present disclosure generally relates to computer-based systems configured to manage mesh networks by performing various activities such as, without limitations, tracking bandwidth contribution to the mesh network by mesh network nodes that may have component(s) integrated into various roofing materials of various structures.

BACKGROUND OF TECHNOLOGY

For example, mesh networks rely on each mesh node for routing traffic from one or more sources to one or more destinations. For example, tracking contributions of each node to a communication of data from a source to a destination is practical application that allows, for example, without limitations, to optimize a mesh network and incentivize various participants to contribute their computing devices to be programmed as mesh nodes.

SUMMARY OF DESCRIBED SUBJECT MATTER

In some embodiments, the present disclosure provides a technically improved computer-based method that includes at least the following steps of receiving, by a processor of a gateway of an integrated roofing mesh network node in a mesh network of other nodes, a plurality of received data packets from the mesh network; transmitting, by the processor, a plurality of transmitted data packets to the mesh network; wherein each data packet of the plurality of received data packets and the plurality of transmitted data packets comprises: i) a source address of a sending node, ii) a destination address of a receiving node, and iii) a payload of data; comparing, by the processor, the source address and the destination address of each data packet with an address associated with the gateway; determining, by the processor, passthrough traffic based at least in part on: i) the address associated with the gateway, and ii) the source address and the destination address of each data packet; wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet; determining, by the processor, a passthrough data capacity based at least in part on the payload of data of each data packet in the subset; determining, by the processor, a metric based at least in part on the passthrough data capacity; and communicating, by the processor, the metric to service provider to notify the service provider of an amount of mesh network bandwidth provided by the passthrough data capacity of the integrated roofing mesh network node.

In some embodiments, the present disclosure provides a technically improved computer-based system that includes at least the following components of a gateway of an integrated roofing mesh network node in communication with a mesh network of other nodes, wherein the gateway comprises a processor configured to execute software instructions. The software instructions, when executed, cause the processor to perform steps to: receive a plurality of received data packets from the mesh network; transmit a plurality of transmitted data packets to the mesh network; wherein each data packet of the plurality of received data packets and the plurality of transmitted data packets comprises: i) a source address of a sending node, ii) a destination address of a receiving node, and iii) a payload of data; compare the source address and the destination address of each data packet with an address associated with the gateway; determine passthrough traffic based at least in part on: i) the address associated with the gateway, and ii) the source address and the destination address of each data packet; wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet; determine a passthrough data capacity based at least in part on the payload of data of each data packet in the subset; determine a metric based at least in part on the passthrough data capacity; and communicate the metric to service provider to notify the service provider of an amount of mesh network bandwidth provided by the passthrough data capacity of the integrated roofing mesh network node.

In some embodiments, the present disclosure provides another technically improved computer-based method that includes at least the following steps of receiving, by a processor of a gateway of an integrated roofing mesh network node in a mesh network of other nodes, a data packet associated with the mesh network; wherein the data packet comprises: i) a header specifying: a virtual mesh network identifier identifying a virtual mesh network operating as a tenant of the mesh network, a source address of a sending node, and a destination address of a receiving node, and iii) a payload of data; identifying, by the processor, the data packet as passthrough traffic based at least in part on: i) the address associated with the gateway, and ii) the address and the destination address of the data packet; wherein the passthrough traffic comprises data traffic that is routed between two or more radio nodes of the mesh network through the gateway of the integrated roofing mesh network node based at least in part on the source address and the destination address of the data packet; determining, by the processor, a passthrough data capacity based at least in part on the payload of data of the data packet; determining, by the processor, a service provider of the mesh network based at least in part on the virtual mesh network identifier; determining, by the processor, a service provider-specific metric based at least in part on the passthrough data capacity and the service provider of the mesh network; and communicating, by the processor, the metric to the service provider to notify the service provider of an amount of mesh network bandwidth provided by the passthrough data capacity of the integrated roofing mesh network node.

In some embodiments, systems and/or methods of the present disclosure further include determining, by the processor, consumed traffic based at least in part on: i) the address associated with the processor, and ii) the source address and the destination address of each data packet;

wherein the consumed traffic comprises a second subset of the plurality of received data packets and the plurality of the transmitted data packets that is routed between the integrated roofing mesh network node and radio node of the mesh network based at least in part on the source address and the destination address of each data packet; determining, by the processor, a consumed data capacity based at least in part on the payload of data of each data packet in the second subset; and determining, by the processor, the metric based at least in part on the passthrough data capacity and the consumed data capacity.

In some embodiments, systems and/or methods of the present disclosure further include wherein the metric comprises a ratio of the passthrough data capacity to the consumed data capacity.

In some embodiments, systems and/or methods of the present disclosure further include determining, by the processor, a size of the payload of data of each data packet in the subset.

In some embodiments, systems and/or methods of the present disclosure further include wherein the passthrough data capacity comprises a sum of the size of the payload of data of each data packet in the subset over a first period of time.

In some embodiments, systems and/or methods of the present disclosure further include determining, by the processor, a data communication prioritization parameter based at least in part on the passthrough data capacity; wherein the data communication prioritization parameter comprises relative priority of communication of the passthrough data traffic and non-passthrough data traffic; and instructing, by the processor, the gateway to prioritize communication of a plurality of future received data packets and a plurality of future transmitted data packets based at least in part on the data communication prioritization parameter.

In some embodiments, systems and/or methods of the present disclosure further include determining, by the processor, a tenant mesh network associated with each data packet in the subset; wherein the mesh network of radio nodes comprises a physical infrastructure layer; wherein a service layer utilizes the physical infrastructure layer for data service, the service layer comprising a plurality of tenant mesh networks sharing the mesh network of the physical infrastructure layer; determining, by the processor, the passthrough data capacity associated with the tenant mesh network based at least in part on the payload of data of each data packet associated with the tenant mesh network in the subset; determining, by the processor, tenant-specific metric based at least in part on the passthrough data capacity; and communicating, by the processor, the tenant-specific metric to a service provider associated with the tenant mesh network.

In some embodiments, systems and/or methods of the present disclosure further include detecting, by the processor, a signal strength of the integrated roofing mesh network node with each radio node of the mesh network; and utilizing, by the processor, a data communication prediction machine learning model to estimate a consumed data capacity for a next period of time; wherein the consumed data capacity comprises a second subset of the plurality of received data packets and the plurality of the transmitted data packets that is routed between the integrated roofing mesh network node and radio node of the mesh network based at least in part on the source address and the destination address of each data packet.

In some embodiments, systems and/or methods of the present disclosure further include wherein the mesh network comprises a fifth generation cellular (5G) network, the integrated roofing mesh network node comprises an integrated 5G radio.

In some embodiments, systems and/or methods of the present disclosure further include wherein the mesh network comprises a physical infrastructure layer comprising of the integrated roofing mesh network node and the other nodes, and wherein the mesh network comprises a multi-tenancy virtual network layer having a plurality of virtual mesh networks.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
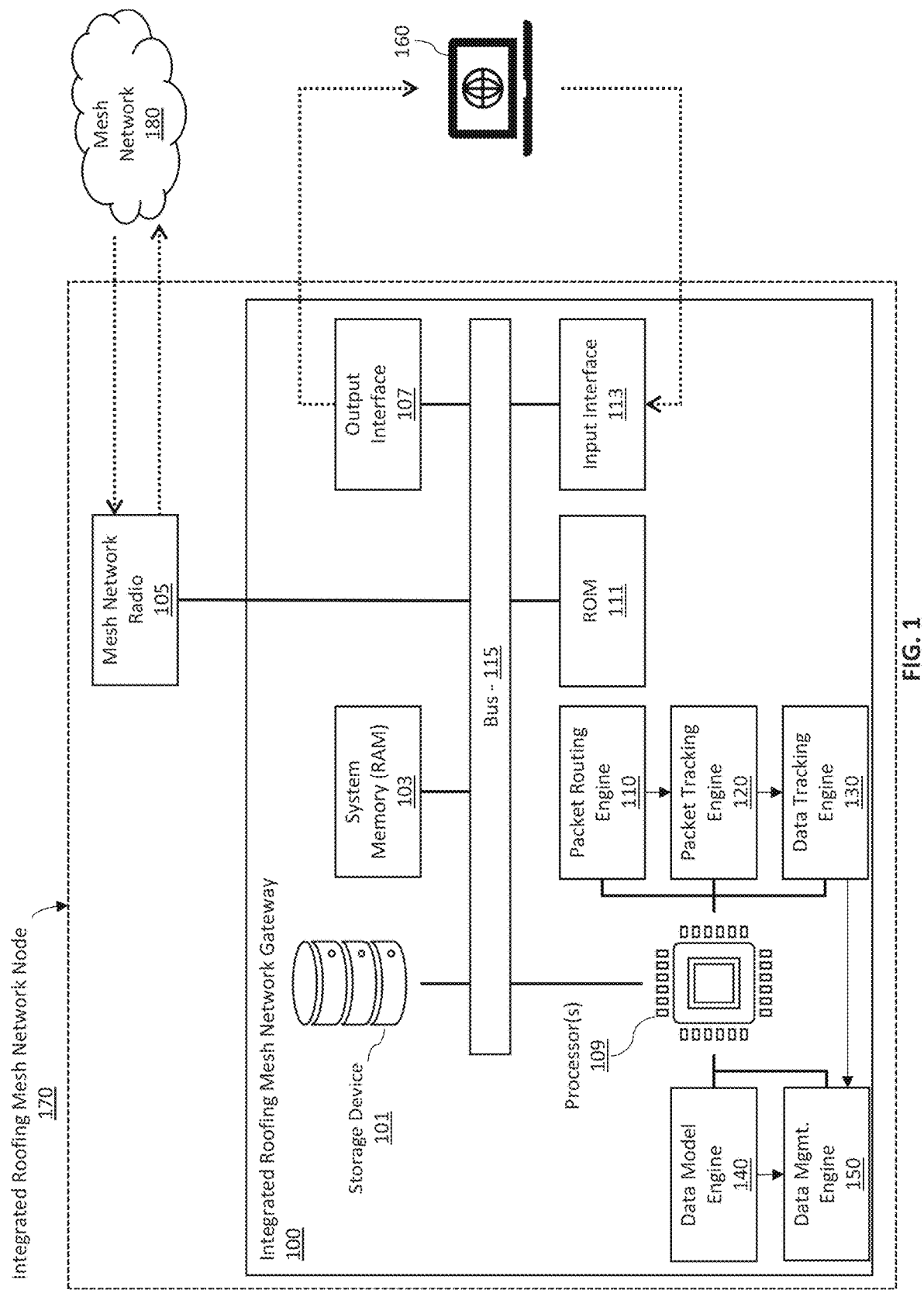
FIG. 1 is a block diagram illustrating a roofing integrated mesh network gateway in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 12 illustrate systems and methods for managing mesh networks having mesh nodes of integrated roofing mesh network gateways, by performing various activities such as, without limitations, bandwidth tracking (e.g., bandwidth consumption, bandwidth use for passthrough traffic, etc.) to measure and/or track participation in a meshed network. The following embodiments provide technical solutions and technical improvements that overcome technical problems, drawbacks and/or deficiencies in the technical fields involving mesh network management, including improvements in measuring and/or tracking contributions of node(s), having one or more integrated roofing mesh network gateways, to a mesh network. As explained in more detail, below, technical solutions and technical improvements herein may include one or more aspects of an improved passthrough data capacity measurement and tracking, a mesh network optimization, and incentivization of network participation. Moreover, various practical applications disclosed herein provide further practical benefits to users and operators that are also new and useful improvements in the art.

In some embodiments, a mesh network node may be integrated into roofing material, such as, without limitations, a shingle, underlayment, ridge vent, chimney, roof vent, or other roofing structure. In some embodiment, the mesh network node may relay data between other nodes in the mesh network as a part of network traffic routing. In some embodiments, some or all of the network traffic passing through the mesh network node may be relayed to other nodes on the mesh network, or may be provided to one or more computing device(s) in a structure associated with the mesh network node, or any combination thereof. For example, the mesh network node may provide connectivity between computing device(s) inside of a structure whose roof has one or more integrated roofing mesh network gateways associated with one or more service provider and/or additional mesh network nodes. In another example, the mesh network node may provide connectivity between computing device(s) and/or mesh network nodes outside of the structure to expand service provider reach. Accordingly, a mesh network node integrated into roofing material ("integrated roofing mesh network node") may act as a node in the service provider's network to expand the reach of the network.

In some embodiments, the integrated roofing mesh network node may include components and functionality (e.g., via a gateway and other computing components) to measure the bandwidth usage of the occupant, as well as the bandwidth usage of all non-occupant traffic passing through the integrated roofing mesh network node. The measurement of bandwidth usage may be used to analyze network performance, offer incentives based on how much additional traffic the occupant's node enabled the carrier to handle, among other network performance and participation uses. In some embodiments, the occupant may receive an incentive just from allowing their roof to be used as part of the mesh network and the incentive amount may scale based on the amount of traffic their roof enables. In some embodiments, the occupant may be a customer of a service provider that communicates network traffic through the integrated roofing mesh network node. Thus, the incentive may include, e.g., a rebate or credit on a data consumption bill or other data use incentive. For example, at the end of a billing period, a total amount of bandwidth consumed by the occupant will be compared against the bandwidth of other traffic passing through their node, and occupant can receive credit based on the amount of traffic flowing through the integrated roofing mesh network node. In another example, where the occupant is not a consumer of data communicated through the integrated roofing mesh network node, the occupant may receive an incentive just from allowing their roof to be used as part of the mesh network via, e.g., cash, partner rewards, gift cards, roofing and/or structure maintenance benefits, among other incentives or any combination thereof.

Accordingly, in some embodiments, the integrated roofing mesh network node may monitor the bandwidth usage passing through the integrated roofing mesh network node, and measure the amount of bandwidth consumed by the occupant ("consumed data capacity") versus the amount of bandwidth provided to the network via passing external traffic between other nodes ("passthrough data capacity"). In some embodiments, the integrated roofing mesh network node or other computing device and/or system may use the consumed data capacity and passthrough data capacity to calculate an incentive or compensation for the occupant for participating in the network.

In some embodiments, such an incentive allows network users to monetize or take advantage of their integrated roofing mesh network nodes and provides incentive for the users to help service provides expand network reach. As a result, the incentive may contribute to the creation of a network effect where the users are incentivized expand the network of devices that can communicate through their node, increasing the performance of the network and allowing for additional users to utilize the network.

While blockchain-related decentralized wireless infrastructure relying on proof-of-work and/or proof-of-stake may be employed to generate cryptocurrency based mechanisms for tracking participation and contribution, such a technique relies on complicated technology and sufficient decentralized participation. Measuring consumed data capacity and passthrough data capacity, on the other hand, enables more efficient tracking and measurement of participation and contribution such that cheaper equipment may be used, bandwidth can be tracked and monitored using fewer resources, and more users may participate with their own nodes.

Some embodiments of the present disclosure relate to methods and systems that include the integrated roofing mesh network node. As defined herein an "integrated roofing mesh network node" is a roofing accessory with at least one 5G-infrastructure-supporting ("5G-enabled") electronic component. In some embodiments, the at least one 5G-infrastructure-supporting electronic component is embedded within at least one roofing accessory component. In another embodiments, the at least one 5G-infrastructure-supporting electronic component is directly or indirectly attached to at least one roofing accessory component.

Some embodiments of the present disclosure relate to integrated roofing mesh network node. Some embodiments of the present disclosure include a plurality of integrated roofing mesh network nodes. Some embodiments of the present disclosure include at least three integrated roofing mesh network nodes. Some embodiments of the present disclosure include at least five integrated roofing mesh network nodes. Some embodiments of the present disclosure include at least ten integrated roofing mesh network nodes. Some embodiments of the present disclosure include at least fifty integrated roofing mesh network nodes. Some embodiments of the present disclosure include at least one hundred integrated roofing mesh network nodes. Some embodiments of the present disclosure include at least one-thousand integrated roofing mesh network nodes.

In some embodiments, there are 1 to 10,000 integrated roofing mesh network nodes. In some embodiments there are 1 to 5000 integrated roofing mesh network nodes. In some embodiments, there are 1 to 1000 integrated roofing mesh network nodes. In some embodiments, there are 1 to 100 integrated roofing mesh network nodes. In some embodiments, there are 1 to 50 integrated roofing mesh network nodes. In some embodiments, there are 1 to 25 integrated roofing mesh network nodes. In some embodiments, there are 1 to 10 integrated roofing mesh network nodes. In some embodiments, there are 1 to 5 integrated roofing mesh network nodes. In some embodiments, there are 1 to 2 integrated roofing mesh network nodes.

In some embodiments, there are 2 to 10,000 integrated roofing mesh network nodes. In some embodiments, there are 5 to 10,000 integrated roofing mesh network nodes. In some embodiments, there are 10 to 10,000 integrated roofing mesh network nodes. In some embodiments, there are 50 to 10,000 integrated roofing mesh network nodes. In some embodiments, there are 100 to 10,000 integrated roofing mesh network nodes. In some embodiments, there are 500 to 10,000 integrated roofing mesh network nodes. In some embodiments, there are 1000 to 10,000 integrated roofing mesh network nodes. In some embodiments, there are 5000 to 10,000 integrated roofing mesh network nodes.

In some embodiments, there are 2 to 5000 integrated roofing mesh network nodes. In some embodiments, there are 5 to 1000 integrated roofing mesh network nodes. In some embodiments, there are 10 to 5000 integrated roofing mesh network nodes. In some embodiments, there are 50 to 100 integrated roofing mesh network nodes. In some embodiments, there are 60 to 90 integrated roofing mesh network nodes. In some embodiments, there are 70 to 80 integrated roofing mesh network nodes.

Non-limiting examples of the at least one roofing accessory component of the integrated roofing mesh network node include: roofing caps, laminate roofing accessories, roofing sheets, ridge caps, ridge vents, roofing frames, roofing shingles and the like, or any combination thereof. Additional non-limiting examples of the at least one portion of the roofing accessory are found in U.S. Pat. Nos. 7,165,363 and 10,180,001, both of which are incorporated by reference in their respective entireties.

FIG. 1 is a block diagram illustrating an integrated roofing mesh network gateway in accordance with one or more embodiments of the present disclosure.

In some embodiments, an integrated roofing mesh network gateway 100 may communicated with a user device 160 to provide a network connection to the user device 160. In some embodiments, the integrated roofing mesh network gateway 100 may include a mesh network radio 105 that is configured to communicate with a mesh network 180 in order to provide the network connection. Accordingly, in some embodiments, the mesh network radio 105 may include a suitable radio, such as, e.g., a receiver and transmitter circuits, software-defined receiver and software-defined transmitter software and hardware elements, among other radio hardware and/or software. In some embodiments, the mesh network radio 105 may include, e.g., one or more antennas and/or one or more arrays of antennas.

In some embodiments, the mesh network radio 105 may emit 5G signals using one or more antennae integrated into a roof of a structure, e.g., via a roofing material and/or roofing accessory and/or roofing accessory component. For example, a dielectric antenna may be embedded in a polymer sized to cover one or more frame components such as, without limitation, an electronics compartment housing radio hardware and/or software components as described above. In some embodiments, the dielectric antenna may be a patch antenna, or other suitable antenna for embedding in the cover such that the cover may form an antenna module covering the electronic components. As a result, the cover may serve as both a roofing accessory to weatherproof a roof of a structure, as well as an antenna for a mesh network.

In some embodiments, the integrated roofing mesh network node 170 includes at least one embedded antenna. As used herein, the term "antenna" or "antennae" can refer to a device that is part of a transmitting or receiving system to transmit or receive wireless signals. In some embodiments, the at least one embedded antenna is configured to perform at least one of the following operations: receiving electromagnetic waves (e.g., 5G signals), transmitting electromagnetic waves (e.g., 5G signals), or any combination thereof.

In some embodiments, the integrated roofing mesh network node 170 is configured to support at least one signal propagation strategy. The at least one signal propagation strategy includes, but is not limited to, at least one of: many inputs—many outputs (MIMO), beam forming mesh, the like, or any combination thereof.

In some embodiments, the at least one embedded antenna is at least one dielectric antenna. In some embodiments, the at least one dielectric antenna takes the form of at least one dielectric antenna array. In some embodiments, the at least one dielectric antenna array includes a plurality of dielectric antennas configured to wirelessly receive a controllable beam in response to electromagnetic waves. In some embodiments, the at least one dielectric antenna array includes a plurality of dielectric antennas configured to wirelessly transmit a controllable beam in response to the electromagnetic waves. In some embodiments, the at least one dielectric antenna array includes a plurality of dielectric antennas configured to wirelessly transmit and receive a controllable beam in response to the electromagnetic waves.

In some embodiments, the dielectric antenna is embedded within the cover or is covered by the cover within the electronics compartment described above. Accordingly, the cover may be constructed from a material that has a minimal effect on the 5G signals emitted by the dielectric antenna, such as a material that is transparent to mmWave signals, thus causing sufficiently low attenuation to the mmWave signals for a stable data transmission or reception. For example, the cover may include a polymer, including engineered polymers, such as the D30™ Gear4™ and 5G Signal Plus material having microvoids for reducing mmWave attenuation, as disclosed by "D30 INTRODUCES 5G SIGNAL PLUS TECHNOLOGY", D30 Press Release, <https://www.d3o.com/partner-support/press-releases/d3o-introduces-5g-signal-plus/> (accessed, 1 Sep. 2020), herein incorporated by reference in its entirety.

In some embodiments, the mesh network may include any suitable mesh network, such as, e.g., a mesh cellular network, a mesh WiFi network, a mesh Bluetooth network, or any suitable wireless networking technology networked according to mesh networking techniques. In some embodiments, mesh networking may include, e.g., a network topology in which the infrastructure nodes (e.g., bridges, switches, and other infrastructure devices) connect directly, dynamically and non-hierarchically to as many other nodes as possible and cooperate with one another to efficiently route data from/to clients. The lack of dependency on one node allows for every node to participate in the relay of information. In some embodiments, mesh networks dynamically self-organize and self-configure, which can reduce installation overhead. The ability to self-configure enables dynamic distribution of workloads, particularly in the event a few nodes should fail. This in turn contributes to fault-tolerance and reduced maintenance costs.

In some embodiments, the mesh network 180 may include multiple service providers operating in a multi-tenancy arrangement on a common physical infrastructure. In some embodiments, the integrated roofing mesh network nodes 170 across the mesh network 180 may define the total physical infrastructure of the mesh network, and each service provider may have virtual networks connected to respective backhaul networks for broader network coverage.

In some embodiments, the integrated roofing mesh network gateway 100 may utilize the mesh network radio 105 to participate in the mesh network 180 for the routing of network traffic amongst nodes and clients on the mesh network 180. In some embodiments, the term node is employed to refer to any communication endpoint connected to the mesh network 180, including, e.g., the integrated roofing mesh network gateway 100 of an integrated roofing mesh network node 170, a user computing device in communication with the mesh network 180 (e.g., a desktop computing device, a mobile computing device, a person digital assistant (PDA), a wearable device such as a smart-watch or smart-glasses, an Internet-of-Things device, etc.) or any other suitable device communicating on the mesh network 180 or any combination thereof.

Non-limiting examples of the user computing device may include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

In some embodiments, the integrated roofing mesh network gateway 100 may employ one or more processor(s) 109 to control the mesh network radio 105 for mesh network 180 communication, including the routing of data over the mesh network 180 and/or to/from a user device 160. In some embodiments, the processor(s) 109 may include at least one processor, microprocessor, circuit, circuit element (e.g., transistors, resistors, capacitors, inductors, and so forth), integrated circuit, application specific integrated circuit (ASIC), programmable logic device (PLD), digital signal processor (DSP), field programmable gate array (FPGA), logic gate, register, semiconductor device, chip, microchip, chip set, and so forth. In some embodiments, the processor(s) 109 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the processor(s) 109 may execute instructions stored in at least one storage component. Non-limiting examples of the at least one storage component may include: read only memory (ROM) 111, random access memory (RAM) 103, and/or a storage device 101 using, e.g., magnetic disk storage media; optical storage media; flash memory devices; electrical, optical, acoustical or other forms of propagated signals (e.g., carrier waves, infrared signals, digital signals, etc.), or any combination thereof.

In some embodiments, the integrated roofing mesh network gateway 100 may utilize the processor(s) 109 to monitor data traffic through the integrated roofing mesh network gateway 100 and track, measure, manage and predict data capacity usage. Accordingly, in some embodiments, the processor(s) 109 may monitor protocol data units to determine whether each unit of data is associated with the user device 160 or integrated roofing mesh network gateway 100, or whether each unit of data is associated with network traffic routed from an external source to an external destination.

In some embodiments, a protocol data unit (PDU) is a single unit of information transmitted among peer entities of a computer network. A PDU may include protocol-specific control information and user data. In the layered architectures of communication protocol stacks, each layer implements protocols tailored to the specific type or mode of data exchange. For example, the Transmission Control Protocol (TCP) implements a connection-oriented transfer mode, and the PDU of this protocol is called a segment, while the User Datagram Protocol (UDP) uses datagrams as protocol data units for connectionless communication. A layer lower in the Internet protocol suite, at the Internet layer, the PDU is called a packet, irrespective of its payload type.

In some embodiments, to illustrate the monitoring and metering of bandwidth according to aspects of the present disclosure, the PDU is described as a packet in a network such as the Internet. However, the principles described herein are applicable to any suitable networking protocol using any suitable PDU. In some embodiments a packet may include a header and a payload. The header may include of fixed and optional fields. The payload appears immediately after the header.

In some embodiments, a packet header may include addresses, length, priority, among other fixed and/or option fields. In some embodiments, an address may include routing of network packets requires two network addresses, the source address of the sending host, and the destination address of the receiving host. In some embodiments, there may be a field to identify the overall packet length. However, in some types of networks, the length is implied by the duration of the transmission. In some embodiments, the packet may include a priority field. Some networks implement quality of service which can prioritize some types of packets above others. This field indicates which packet queue should be used; a high priority queue is emptied more quickly than lower priority queues at points in the network where congestion is occurring.

In some embodiments, the payload may include the data that is carried on behalf of an application. The data of packet may be of variable length, up to a maximum that is set by the network protocol and sometimes the equipment on the route. When necessary, some networks can break a larger packet into smaller packets.

In some embodiments, the processor(s) 109 may implement a packet routing engine 110 to control local routing of data packets communicated to and/or from the mesh network radio 105. Some data packets may be associated with the user device 160 and/or the integrated roofing mesh network gateway 100, while some data packets may be associated with external nodes on the mesh network 180. Accordingly, the packet routing engine 110 may examine the addresses of each packet to identify whether each packet is associated with a known source and/or destination (e.g., the user device 160, the integrated roofing mesh network gateway 100, etc.) or whether the packet is associated only with unknown sources and destinations (e.g., other nodes on the mesh network 180). Based on the address, the packet routing engine 110 may route each packet either to the mesh network 180 via mesh network radio 105 or to the user device 160, e.g., via an output interface 107. Similarly, packets created by the user device 160 may route to the mesh network 180 according to the addresses via the input interface 113 and the mesh network radio 105.

Moreover, in some embodiments, where the integrated roofing mesh network gateway 100 is part of a physical infrastructure layer with virtual mesh networks operating thereon according to a multi-tenancy arrangement, the packet routing engine 110 may log, e.g., in the storage device 101 and/or the RAM 103, the addresses as well as the service provider with which each packet is associated. Thus, each packet may be attributed to internal traffic or external traffic, as well as a particular service provider.

In some embodiments, each packet routed can be tracked by a packet tracking engine 120. Thus, packets associated with the user device 160, e.g., as the source or the destination of the packets, may be tracked as consumed data communicated across the mesh network 180. The consumed data refers to inbound data and/or outbound data attributable to the user device 160. Similarly, packets associated only with external nodes (e.g., nodes on the mesh network 180 that are routed through the integrated roofing mesh network gateway 100) and not the user device 160 may be tracked as passthrough data that passes through the integrated roofing mesh network gateway 100 to provide a communication path in the mesh network 180. In some embodiments, the packet tracking engine 120 may determine the size of the payload of each packet to assess the amount of data used by the consumed data and by the passthrough data. The size of each packet may then be added to the log to log the size of each packet attributed to internal traffic or external traffic, as well as a particular service provider.

In some embodiments, a data tracking engine 130 may utilize the size of the payload of each packet of consumed data and each packet of passthrough data to measure the bandwidth usage attributable to the consumed data and the passthrough data. The data tracking engine 130 may access the log of packets and packet sizes and produce a data communication metric for each of the consumed data and the passthrough data to measure the consumed data capacity and the passthrough data capacity. In some embodiments, the data tracking engine 130 may formulate the data communication metric for each service provider, for each of the consumed data capacity and the passthrough data capacity and/or for the physical infrastructure layer of the mesh network 180.

In some embodiments, the term bandwidth may refer to the net bit rate 'peak bit rate', 'information rate,' or physical layer 'useful bit rate', channel capacity, or the maximum throughput of a logical or physical communication path, which, in the case, may include the mesh network 180, the integrated roofing mesh network gateway 100 or both. In some embodiments, the maximum rate that can be sustained on a link are limited by the Shannon-Hartley channel capacity for communication systems, which is dependent on the bandwidth in hertz and the noise on the channel.

In some embodiments, the consumed data capacity in bit per second (bps), corresponds to achieved throughput or goodput, e.g., the average rate of successful data transfer through a communication path. The consumed data capacity can be affected by technologies such as bandwidth shaping, bandwidth management, bandwidth throttling, bandwidth cap, bandwidth allocation (for example bandwidth allocation protocol and dynamic bandwidth allocation), etc. A bit stream's bandwidth is proportional to the average consumed signal bandwidth in hertz (the average spectral bandwidth of the analog signal representing the bit stream) during a particular time period.

In some embodiments, the term channel bandwidth may be confused with useful data throughput (or goodput). For example, a channel with 'x' bps may not necessarily transmit data at x rate, since protocols, encryption, and other factors can add appreciable overhead. For instance, much internet traffic uses the transmission control protocol (TCP), which requires a three-way handshake for each transaction. Although in many modern implementations the protocol is efficient, it does add significant overhead compared to simpler protocols. Also, data packets may be lost, which further reduces the useful data throughput. In general, for any effective digital communication, a framing protocol is needed; overhead and effective throughput depends on implementation. Useful throughput is less than or equal to the actual channel capacity minus implementation overhead.

In some embodiments, the data tracking engine 130 may measure the data communication metric over a period of time, such as, e.g., a billing period defined by a service provider, such as a service provider that provides data coverage via the mesh network 180. Accordingly, the data communication metric may define, e.g., a sum, average, median, or other statistical aggregation of bandwidth per time per service provider. In some embodiments, the bandwidth may be measured as goodput (e.g., bits communicated through the integrated roofing mesh network gateway 100 per time). In some embodiments, the time period may include, e.g., a second, a minute, an hour, a day, a week, a month, or other suitable period of for defining consumed data capacity and passthrough data capacity usage. In some embodiments, the data communication metric may be one or more tokens on a blockchain, where the one or more tokens accrue in value/quantity/amount as the passthrough data is communicated by the integrated roofing mesh network gateway 100.

Accordingly, in some embodiments, the mesh network and the integrated roofing mesh network gateway 100 may be configured interact and/or to store data in one or more private and/or private-permissioned cryptographically-protected, distributed database such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the private and/or private-permissioned cryptographically-protected, distributed database and/or distributed ledger may be implemented as a layer of the mesh network, such as, e.g., as a tenant on the mesh network infrastructure. In some embodiments, the private and/or private-permissioned cryptographically-protected, distributed database and/or distributed ledger may be implemented using the mesh network and/or using a separate mesh network alongside the mesh network, such as, e.g., using a separate radio and/or transceiver of each integrated roofing mesh network gateway 100 in the mesh network.

In some embodiments, the data tracking engine 130 may maintain a data structure to track data capacity through time. In some embodiments, the data structure may include, e.g., a table, comma-separated-values (CSV), or other data structure that tallies consumed data capacity and passthrough data capacity usage over a period of time (e.g., a billing period, or other suitable time period as described above). The data structure may be stored, e.g., locally in the integrated roofing mesh network gateway 100, in a cloud service or centralized server and/or database, or any combination thereof. Accordingly, in some embodiments, the data structure may be accessed across the mesh network 180 using, e.g., an API by, e.g., a billing engine, customer website, or any suitable technical service or any combination thereof. As a result, the customer, the carrier, or other suitable entity may access the data structure and the consumed data capacity and passthrough data capacity usage (e.g., the data capacity used by the customer and the data capacity contributed by the customer to the mesh network 180).

In some embodiments, the data communication metric may define the amount of bandwidth used by the user device 160 via the consumed data capacity versus the amount of bandwidth added to the mesh network 180 by the integrated roofing mesh network gateway 100 via the passthrough data capacity. In some embodiments, the data communication metric may include the magnitude of the passthrough data capacity according to the statistical aggregation, a ratio of the magnitudes of the passthrough data capacity and consumed data capacity, a ratio of the passthrough data capacity to a total mesh network 180 bandwidth, or other suitable characterization measuring participation by the integrated roofing mesh network node 170 in the mesh network 180.

In some embodiments, the data tracking engine 130 may log the passthrough data capacity, the consumed data capacity, and/or the data communication metric, e.g., in the storage device 101 and/or the RAM 103. In some embodiments, a data model engine 140 may access the log of the passthrough data capacity, the consumed data capacity, and/or the data communication metric to use a data communication prediction model to learn patterns of the participation by the integrated roofing mesh network node 170 in the mesh network 180. Accordingly, the data model engine 140 may predict the data communication metric for a next period of time based on the patterns.

In some embodiments, the inventive computer-based systems/platforms, the inventive computer-based devices, and/or the inventive computer-based components of the present disclosure may be configured to utilize one or more AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an neutral network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:
  a. define Neural Network architecture/model,
  b. transfer the input data to the neural network model,
  c. train the model incrementally,
  d. determine the accuracy for a specific number of timesteps,
  e. apply the trained model to process the newly-received input data,
  f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, etc.) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In some embodiments, the integrated roofing mesh network gateway 100 may provide the data communication metric and/or the predicted data communication metric to one or more providers, e.g., via the mesh network 180. For example, in some embodiments, the integrated roofing mesh network gateway 100 may send data via the mesh network radio 105 as an outbound transmission addressed to the one or more providers. In some embodiments, the one or more providers may include an operator of the physical infrastructure of the mesh network 180, an operator of a virtual mesh network that employs the physical infrastructure, or other provider or any combination thereof.

In some embodiments, a computing system associated with the provider(s) may use the data communication metric and/or predicted data communication metric to manage network routing configurations to optimize the distribution of traffic across the mesh network 180, e.g., using a data management engine or data management engine service or other hardware, software or combination thereof configured to manage traffic routing through the mesh network 180. In some embodiments, by receiving the data communication metric and/or predicted data communication metric from each integrated roofing mesh network node 170 on the mesh network 180, a provider may be provided with real-time updates to not only node performance and bandwidth usage, but also node bandwidth contribution. For example, the data communication metric and/or predicted data communication metric may be recorded in a log of the provider or by another other means of notifying the provider of the data communication metric and/or predicted data communication metric.

As a result, optimization functions defining the routing of traffic in the mesh network 180 can be employed to optimize the routing of traffic based on the distribution of bandwidth consumption across nodes, the distribution of bandwidth contribution across nodes, the distribution of a ratio of bandwidth consumption to bandwidth contribution, among other measurements of network capacity and network performance using the data communication metric and/or predicted data communication metric. Accordingly, based on the optimization functions, the provider may configure the mesh network 180 to adjust routing such that bandwidth and/or bandwidth contribution are maximized.

In some embodiments, the optimization functions may include a cost optimization function. Users may be provided with incentives (e.g., cash rewards, rebates, discounts, etc.) for bandwidth contribution at their integrated roofing mesh network nodes 170. The value of the incentives may be an input to the optimization functions to minimize cost while maximizing performance of the mesh network 180. For example, the data communication metric and/or predicted data communication metric may be provided to the provider to be redeemed for incentives. In some embodiments, for example, a token on a blockchain may be redeemed as payment for, e.g., money, credit on a bill, additional data on a service plan (e.g., cellular data plan, cable plan, fiber optic plan, WiFi hotspot plan, etc.), a gift card, a rebate on products and/or equipment, among other incentives or any combination thereof. In some embodiments, for example, the data communication metric may be exchanged by a suitable conversion methodology for, e.g., money, credit on a bill, additional data on a service plan (e.g., cellular data plan, cable plan, fiber optic plan, WiFi hotspot plan, etc.), a gift card, a rebate on products and/or equipment, among other incentives or any combination thereof. For example, the data communication metric may include points or other quantity indicator to be redeemed for a monetary equivalent or product/services equivalent.

Alternatively, or in addition, in some embodiments, the integrated roofing mesh network gateway 100 may include a data management engine 150 to manage data traffic and/or bandwidth utilization by the integrated roofing mesh network node 170. Similar to a provider, the data management engine 150 may use one or more optimization functions to optimize communications by the integrated roofing mesh network node 170. For example, the data management engine 150 may use the data communication metric, the predicted data communication metric and any applicable incentives (e.g., according to an incentive structure specifying incentives and incentive values according to the data communication metric) to maximize incentives and consumed data capacity performance, maximize performance, or optimize according to any other suitable prioritization parameter or any combination thereof. Accordingly, the data management engine 150 may utilize the data communication metric and/or the predicted data communication metric to determine a prioritization parameter that defines a priority of traffic through the integrated roofing mesh network node 170 to prioritize passthrough data packets, consumed data packets or any other data packets or any combination thereof. The processor(s) 109 may then control the integrated roofing mesh network gateway 100 via software instructions to execute communications over the mesh network 180 in an order and quantity according to the prioritization parameter.

In some embodiments, the integrated roofing mesh network node 170 may have a limited bandwidth to use for sending and receiving data via the mesh network 180. As a result, there may be times when the passthrough data and the consumed data exceed the available bandwidth of the integrated roofing mesh network node 170. Thus, the optimization function may apportion bandwidth of the integrated roofing mesh network node 170 according to, e.g., a weighting of the passthrough data and the consumed data.

In some embodiments, where incentives are provided for the passthrough data and bandwidth contribution due to the passthrough data, the weighting of the passthrough data and the consumed data may be determined based on the incentives. For example, a user may select, e.g., via the user device 160, a target incentive value for a given period. Based on the target incentive value, the data management engine 150 may execute a prioritization of the routing of passthrough data relative to the routing of consumed data, e.g., by adjusting the weighting. For example, where the target incentive value is increase, the weighting of the routing of the passthrough data may be increased relative to the weighting of the routing of the consumed data (e.g., by increasing the weighting of the routing of the passthrough data, decreasing the weighting of the routing of the consumed data, or any combination thereof). As a result, in some embodiments, in times of low bandwidth (e.g., bandwidth available to the integrated roofing mesh network node 170 being below the bandwidth needed for all of the passthrough data and the consumed data), the data management engine 150 may prioritize, according to the weightings, the routing of future passthrough data or the routing of future non-passthrough data associated with communications that are not passthrough data packets, such as future consumed data.

Figure 2:
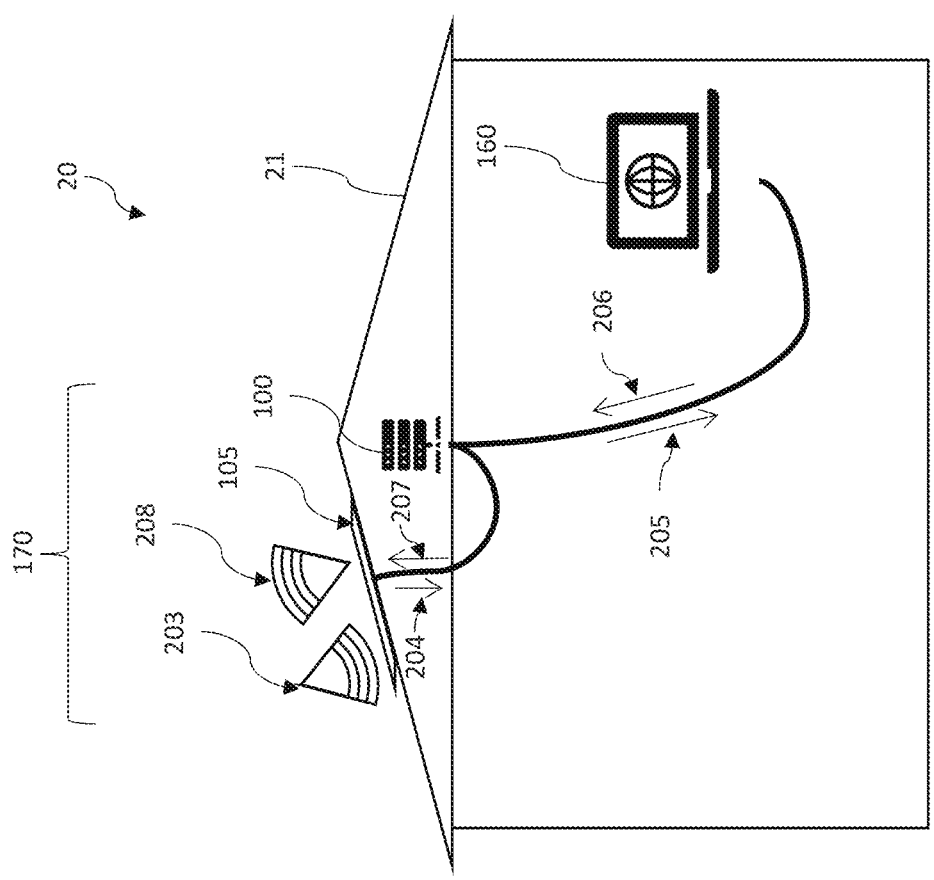
FIG. 2 is a block diagram illustrating a structure having a roofing integrated mesh network gateway in accordance with one or more embodiments of the present disclosure.

FIG. 2 is a block diagram illustrating a structure having an integrated roofing mesh network gateway in accordance with one or more embodiments of the present disclosure.

In some embodiments, the integrated roofing mesh network gateway 100 may be connected to a mesh network radio 105 installed at a user premises, such as integrated into a roof 21 of a structure 20. In some embodiments, the structure 20 may include a residential structure, such as house, townhouse, condominium or other residential structure. The structure 20 may include a commercial structure such as, e.g., an office building, apartment building, store, warehouse, transportation-related structure (e.g., train station, bus stop, airport, parking garage, etc.), or other roofed structure or any combination thereof.

In some embodiments, the integrated roofing mesh network gateway 100 monitors inbound data packets 203 of inbound network traffic and outbound data packets 208 of outbound network traffic passing through the mesh network radio 105. In some embodiments, the inbound data packets 203 and outbound data packets 208 may be analyzed, and traffic source and destination is attributed to either a known or unknown source. In some embodiments, the total bandwidth consumed by each source is measured, and the user's consumption and external traffic consumption may be calculated.

In some embodiments, the integrated roofing mesh network gateway 100 may receive inbound data packets 203 from the inbound data packets 203 received by the mesh network radio 105. Based on the addresses in each inbound data packet 203, the integrated roofing mesh network gateway 100 may either route each inbound data packet 203 to the user device 160 to deliver data requested by the user device 160, for route the inbound data packets 203 externally, e.g., to another node, as outbound data packets 207 for transmission with the outbound data packets 208.

In some embodiments, the inbound data packets 203 routed to the user device 160 may be conveyed as user consumed data packets 205 to the user device 160, e.g., via a wired or wireless connection between the integrated roofing mesh network gateway 100 and the user device 160. Similarly, in some embodiments, the user device 160 may send data across the mesh network by conveying user produced data packets 206 to the integrated roofing mesh network gateway 100 for routing across the mesh network. In some embodiments, the integrated roofing mesh network gateway 100 may receive the user produced data packets 206 and communicated the user produced data packets 206 to the mesh network radio 105 with the outbound data packets 207 for transmission as outbound data packets 208.

In some embodiments, the integrated roofing mesh network gateway 100 may measure the amount of bandwidth of the mesh network radio 105 consumed by the inbound data packets 203 and outbound data packets 207 associated with the user consumed data 204 and the user produced data packets 206 to determine the consumed data capacity of the mesh network. In some embodiments, the integrated roofing mesh network gateway 100 may also measure the amount of bandwidth of the mesh network radio 105 consumed by the inbound data packets 203 and outbound data packets 207 associated with neither the user consumed data 204 nor the user produced data packets 206 to determine the passthrough data capacity of the mesh network representing the bandwidth added to the mesh network by the integrated roofing mesh network gateway 100 and mesh network radio 105.

Figure 3:
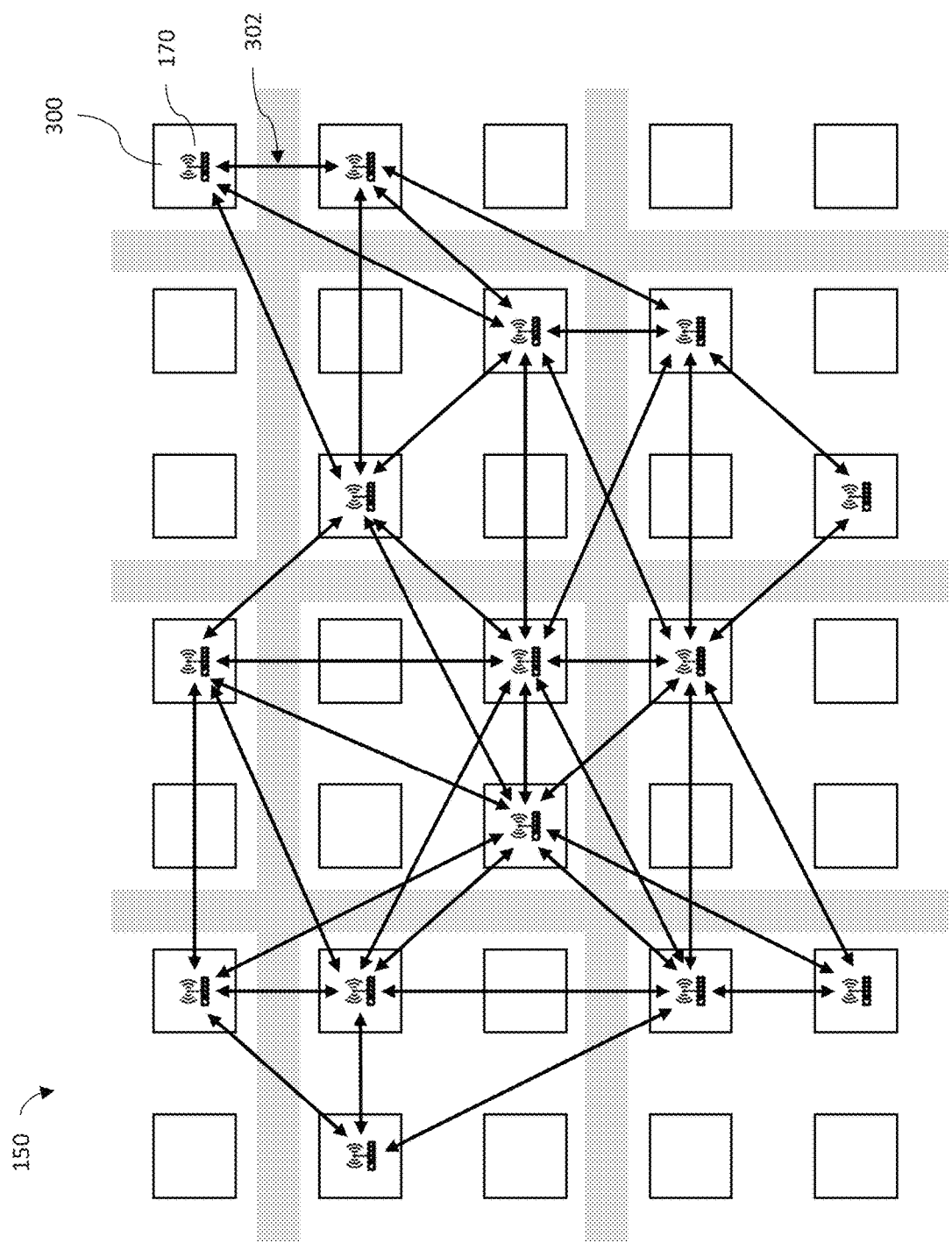
FIG. 3 is a block diagram illustrating a mesh network made of integrated roofing mesh network gateways in accordance with one or more embodiments of the present disclosure.

FIG. 3 is a block diagram illustrating a mesh network of integrated roofing mesh network gateways in accordance with one or more embodiments of the present disclosure.

In some embodiments, the integrated roofing mesh network node 170 and the integrated roofing mesh network gateway 100 can be installed on a plurality of roofs of a plurality of structures 300 so as to create an integrated roofing accessory network (5G network). In some embodiments, a plurality of integrated roofing mesh network nodes 170 described herein can be installed on a single roof so as to create the mesh network of integrated roofing mesh network nodes 170.

In some embodiments, a method of using an integrated roofing accessory network described herein includes: providing a plurality of integrated roofing mesh network nodes 170 as described herein; transmitting at least one electromagnetic signal 302 (e.g., a 5G signal) from a first integrated roofing mesh network node 170; and receiving the at least one electromagnetic signal 302 by a second integrated roofing mesh network node 170. In some embodiments, the second integrated roofing mesh network node 170 further transmits the at least one electromagnetic signal 302 to a third integrated roofing mesh network node 170, and so on. In some embodiments, the first integrated roofing mesh network node 170 is located on a first structure 300, the second integrated roofing mesh network node 170 is located on a second structure 300, the third integrated roofing mesh network node 170 is located on a third structure 300, and so on.

In some embodiments, the mesh network 180 may include multiple service providers, each having a tenant virtual mesh network operating in a multi-tenancy arrangement on a common physical infrastructure formed by the plurality integrated roofing mesh network nodes 170 of the plurality of structures 300. In some embodiments, the integrated roofing mesh network nodes 170 across the mesh network 180 may define the physical infrastructure of the mesh network 180, and each service provider may have virtual networks layered on top of the mesh network 180 using the physical infrastructure and connected to respective backhaul networks for broader network coverage.

Figure 4:
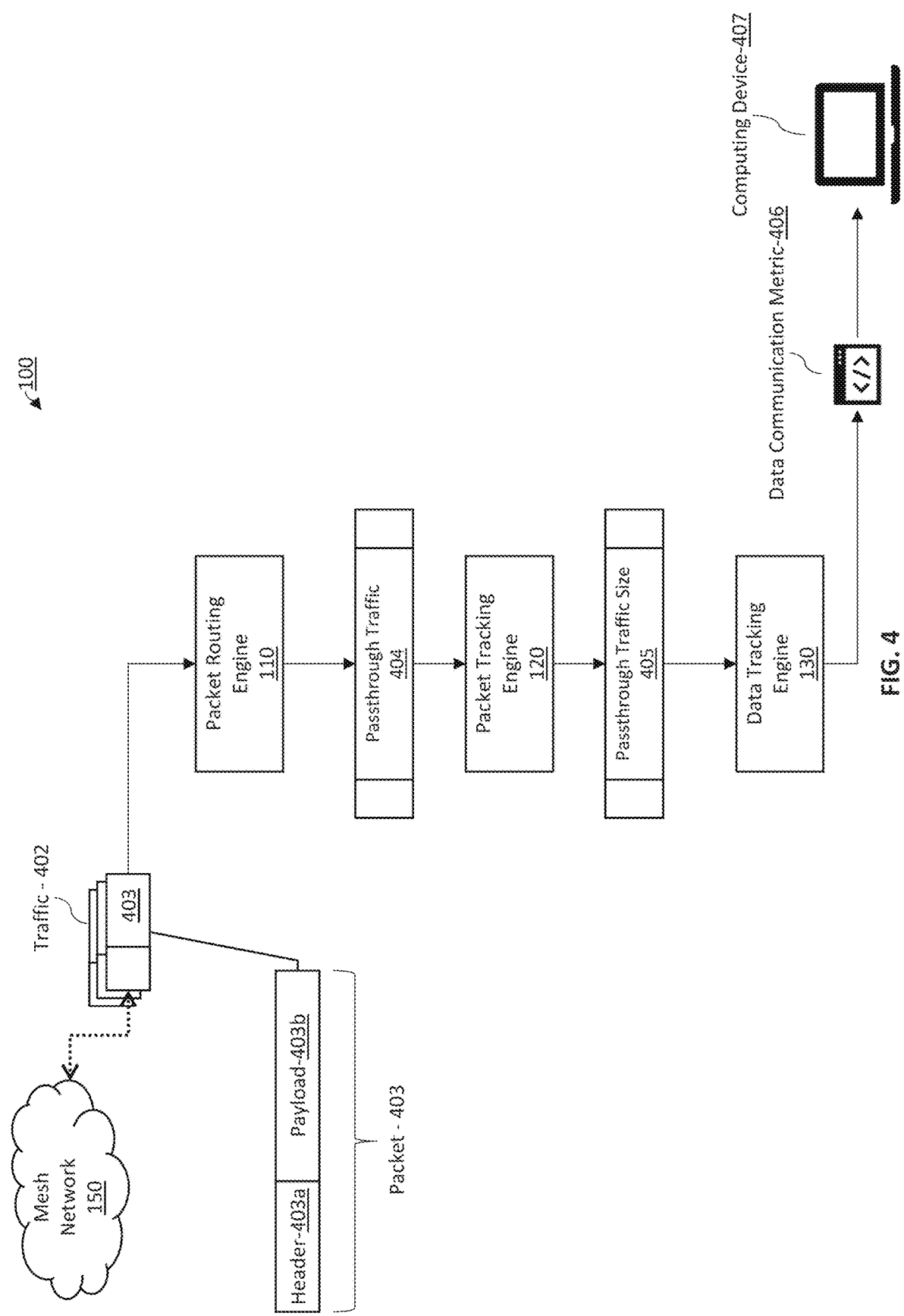
FIG. 4 illustrates a flowchart of an illustrative mesh network management methodology that employs an integrated roofing mesh network gateway in accordance with one or more embodiments of the present disclosure.

FIG. 4 illustrates a flowchart of an illustrative bandwidth tracking methodology using the integrated roofing mesh network gateway in accordance with one or more embodiments of the present disclosure.

In some embodiments, the integrated roofing mesh network gateway 100 may monitor traffic 402 received and transmitted on the mesh network 180 by the integrated roofing mesh network gateway 100. In some embodiments, the traffic 402 may include packets 403 carrying data according to communications instructed by devices on the mesh network 180. Each packet 403 may include a header 403*a* and a payload 403*b*. In some embodiments, the header 403*a* may define a source address and a destination address of each packet while the payload 403*b* may carry the data being communicated according to the instruction by the devices on the mesh network 180. In some embodiments, each packet 403 may be transmitted by the integrated roofing mesh network gateway 100 to an external destination address on the mesh network 180 from, e.g., the user device 160 or other local device local to the integrated roofing mesh network gateway 100, received by the integrated roofing mesh network gateway 100 from an external source address on the mesh network 180 to, e.g., the user device 160 or other local device local to the integrated roofing mesh network gateway 100, or may be received by the integrated roofing mesh network gateway 100 from an external source address on the mesh network 180 and then retransmitted to an external destination address on the mesh network 180. In some embodiments, the packet routing engine 110 may control the integrated roofing mesh network gateway 100 and, e.g., the mesh network radio 105, to transmit and/or receive each packet according to the source and destination address of each header 403*a*.

In some embodiments, the packet routing engine 110 may also log the routing of the packets 403 where the packets 403 that have a source address and/or destination address of the user device 160 or other local device local to the integrated roofing mesh network gateway 100 may be logged as consumed traffic. In some embodiments, where the packets 403 do not have a source address nor destination address associated with the user device 160 or other local device local to the integrated roofing mesh network gateway 100 may be logged as passthrough traffic that passes through the integrated roofing mesh network gateway 100 as a part of the mesh network 180 routing. Accordingly, the passthrough traffic 404 contributes to the communication capacity of the mesh network 180.

Accordingly, the packet tracking engine 120 may access the log of the passthrough traffic 404 in order to monitor the contribution of the integrated roofing mesh network gateway 100 to communications across the mesh network 180. In some embodiments, the contributions may be measured according to the size of the passthrough traffic, such as the data size of each packet 403, the throughput of packets 403 (e.g., data rate of payloads 403*b* communicated), and/or according to the size of the consumed traffic. Accordingly, the packet tracking engine 120 may produce and log the passthrough traffic size 405 based on the payloads 403*b* of the passthrough traffic 404 packets 403.

In some embodiments, a data tracking engine 130 may utilize the passthrough traffic size 405 to measure the bandwidth usage attributable to the passthrough data. In some embodiments, the data tracking engine 130 may formulate the data communication metric 406 for each service provider according to the passthrough traffic size 405 for passthrough traffic 404 of each service provider.

In some embodiments, the data tracking engine 130 may measure the data communication metric 406 over a period of time, such as, e.g., a billing period defined by a service provider, such as a service provider that provides data coverage via the mesh network 180. Accordingly, the data communication metric 406 may define, e.g., a sum, average, median, or other statistical aggregation of data communicated over the mesh network through the integrated roofing mesh network node 170 (such as, e.g., bandwidth) per time per service provider. In some embodiments, the data communicated may be measured as a type of bandwidth measurement, e.g., goodput (e.g., bits communicated through the integrated roofing mesh network gateway 100 per time). In some embodiments, the time period may include, e.g., a second, a minute, an hour, a day, a week, a month, or other suitable period of for defining consumed data capacity and passthrough data capacity usage.

In some embodiments, the data communication metric 406 may define the amount of data communication capacity used by the user device 160 via the consumed data capacity versus the amount of data capacity added to the mesh network 180 by the integrated roofing mesh network gateway 100 via the passthrough data capacity. In some embodiments, the data communication metric 406 may include the magnitude of the passthrough data capacity according to the statistical aggregation, a ratio of the magnitudes of the passthrough data capacity and consumed data capacity, a ratio of the passthrough data capacity to a total mesh network 180 bandwidth, or other suitable characterization measuring participation by the integrated roofing mesh network node 170 in the mesh network 180.

In some embodiments, the data communication metric 406 may be communicated to a computing device 407 associated with a service provider and/or physical infrastructure provider. In some embodiments, the mesh network 180 may communicate control data and bearer data. The bearer data may include data bearing traffic, such as the packets 403 of the traffic 402. The bearer traffic is related to the amount of data sent and received by each node on the mesh network 180, and thus has the greatest effect on network capacity. Control data may include traffic associated with reporting network performance and analytics, among other operational network information. Thus, in some embodiments, the data communication metric 406 may ignore control data to prevent the operational network information from effecting the tracking of the participation by the integrated roofing mesh network gateway 100 in the mesh network 180.

Accordingly, an administrator may access visualizations for the data communication metrics 406 for the integrated roofing mesh network gateway 100 to identify the participation of the integrated roofing mesh network gateway 100 in the mesh network 180 and contribution to the mesh network capacity as a result of that participation. In some embodiments, the computing device 407 may produce visualizations such as graphs, tables, charts, and other presentations of the data communication metric 406 for the integrated roofing mesh network gateway 100 for each period of time. Additionally, in some embodiments, the computing device 407 may generate an incentive recommendation to instruct the rebate or reward of the contribution of the integrated roofing mesh network gateway 100 to the mesh network 180. For example, in some embodiments, the computing device 407 may include an algorithm for generating a financial reward based on the data communication metric 406, such as, e.g., a reduction in a service bill, a rebate for additional data service, or other financial incentive.

In some embodiments, the computing device 407 may generate a network optimization recommendation or instruction. In some embodiments, the computing device 407 may assess the data communication metric 406 relative to the bandwidth available and/or used across the mesh network 180 to determine whether the integrated roofing mesh network gateway 100 experiences greater or less passthrough data capacity than other nodes in the mesh network 180. Based on the relate passthrough traffic according to the data communication metric 406 of the integrated roofing mesh network gateway 100, the computing device 407 may generate routing adjustments to better distribute network traffic.

Figure 5:
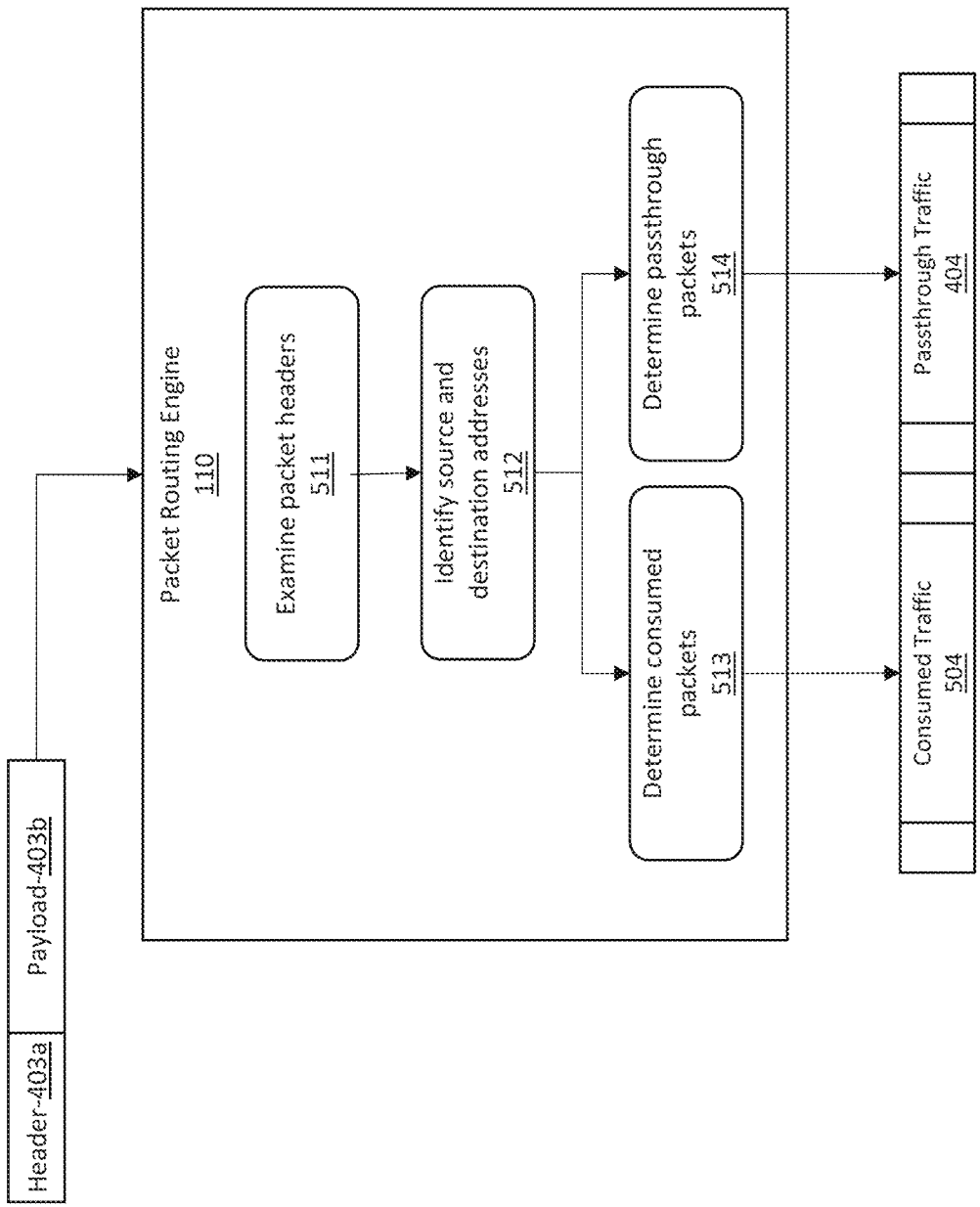
FIG. 5 illustrates a flowchart of an illustrative mesh network packet routing management methodology that employs an integrated roofing mesh network gateway in accordance with one or more embodiments of the present disclosure.

FIG. 5 illustrates a flowchart of an illustrative packet routing tracking methodology for bandwidth tracking using the integrated roofing mesh network gateway in accordance with one or more embodiments of the present disclosure.

In some embodiments, the packet routing engine 110 may access each packet 403 passing through the integrated roofing mesh network gateway 100. For example, the integrated roofing mesh network gateway 100 may receive data packets from the mesh network 180 and may transmit data packets to the mesh network 180. Each of the received data packets and the transmitted data packets may be accessed by the packet routing engine 110 to determine a route for each packet.

To do so, in some embodiments, the packet routing engine 110 may examine, at block 511, the packet headers of each packet of the received data packets and the transmitted data packets. In some embodiments, the source address and the destination address of each packet may be identified and compared, at block 512, to an address associated with the integrated roofing mesh network gateway 100, such as the user device 160 or other device associated with the integrated roofing mesh network gateway 100. In some embodiments, the source address and destination address may include, e.g., unique identifiers across the mesh network 180, although the mesh network 180 may allow for local, private addresses, or locally administered addresses that may not be unique. In some embodiments, the mesh network 180 may utilize special network addresses that are allocated as broadcast or multicast addresses. In some cases, nodes, such as the integrated roofing mesh network gateway 100, may have more than one network address. For example, each network interface may be uniquely identified. Further, because protocols may be layered, more than one protocol's network address can occur in any particular network interface or node and more than one type of network address may be used in any one network. In some embodiments, network addresses can be flat addresses which contain no information about the node's location in the network (such as a MAC address) or may contain structure or hierarchical information for the routing (such as an IP address). Any suitable addressing scheme may be employed, such as, e.g., telephone numbers on a public switched telephone network, internet protocol (IP) addresses, Internetwork Packet Exchange (IPX) address, MAC addresses, X.25 addresses on a circuit switched network, X.21 addresses on a circuit switched network, or any other suitable address or any combination thereof.

In some embodiments, upon identifying the source and destination addresses at block 512, each packet may be classified as a consumed packet at block 513 or a passthrough packet at block 514. In some embodiments, where one of the source address or the destination address of a packet matches the address associated with the node gateway, the packet may be classified at block 513 as the consumed packet. In some embodiments, where neither the source address nor the destination address of a packet matches the address associated with the node gateway, the packet may be classified at block 514 as the passthrough packet.

Accordingly, in some embodiments, the packets may be grouped into two subsets of packets, a first subset of passthrough traffic 404 including the passthrough packets and a second subset of consumed traffic 504 including the consumed packets. Thus, the packet routing engine 110 may monitor the routing of packets via the integrated roofing mesh network gateway 100 and track the passthrough traffic 404 and the consumed traffic 504 of the integrated roofing mesh network node 170 based on whether each packet is associated with data consumption by the integrated roofing mesh network node 170.

Figure 6:
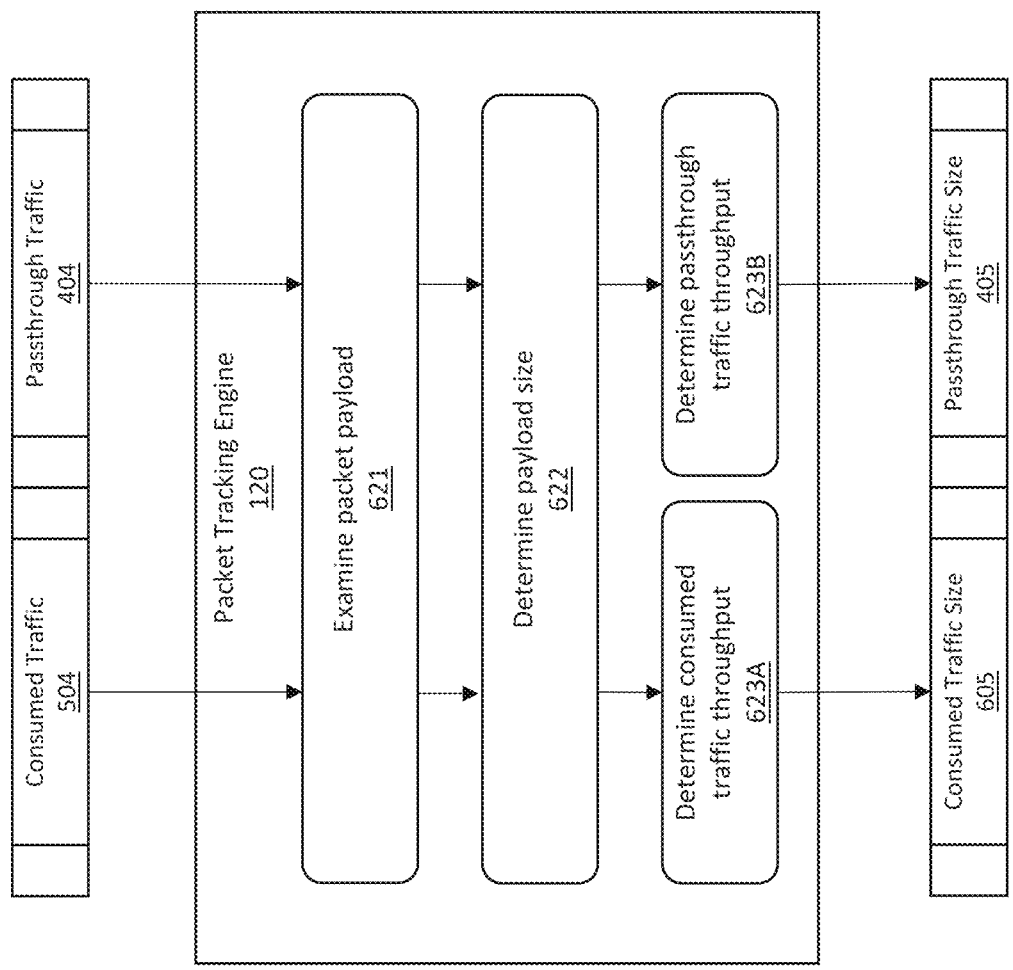
FIG. 6 illustrates a flowchart of an illustrative mesh network packet payload management methodology that employs an integrated roofing mesh network gateway in accordance with one or more embodiments of the present disclosure.

FIG. 6 illustrates a flowchart of an illustrative packet payload tracking methodology for bandwidth tracking using the integrated roofing mesh network gateway in accordance with one or more embodiments of the present disclosure.

In some embodiments, the packet tracking engine 120 may receive the consumed traffic 504 and the passthrough traffic 404 to track packet traffic throughput to assess the data size of traffic. Accordingly, in some embodiments, examine a packet payload 403b for each packet in the consumed traffic 504 and for each packet in the passthrough traffic 404. In some embodiments, the amount of data in the payload 403b of each packet defines the size of the passthrough traffic 404 and the consumed traffic 504. For example, the payload 403b may have a data size in, e.g., bits, kilobits, megabits, gigabits, bytes, kilobytes, megabytes, gigabytes, or other data size measurements.

Therefore, in some embodiments, the packet tracking engine 120 may determine, for each packet of the passthrough traffic 404 and the consumed traffic 504 a payload 403b size at block 622. In some embodiments, the size of the payload 403b may defined, e.g., in the header 403a of each packet. In some embodiments, the packet tracking engine 120 may measure the payload 403b size based on, e.g., a memory footprint used to store the packet and/or payload 403b, such as, e.g., in a buffer, cache, RAM and/or storage device. In some embodiments, the packet tracking engine 120 may determine the payload 403b size of each packet by counting a number of bits of the data contained within the payload 403b. Any other suitable method for determine a data size may be employed.

In some embodiments, the packet tracking engine 120 may track the size of the payload of each of the passthrough traffic 404 and the consumed traffic 504 upon transmission or reception by the integrated roofing mesh network gateway 100. Accordingly, the packet tracking engine 120 may measure the consumed traffic throughput or goodput at block 623A according to an amount of data communicated upon transmission or reception of a consumed data packet in the consumed traffic 504 and, thus, may output a consumed traffic size 605 according to the combined throughput of the consumed traffic 504. Similarly, the packet tracking engine 120 may measure the passthrough traffic throughput or goodput at block 623B according to an amount of data communicated upon transmission or reception of a passthrough data packet in the passthrough traffic 404 and, thus, may output a passthrough traffic size 405 according to the combined throughput of the passthrough traffic 404.

Figure 7:
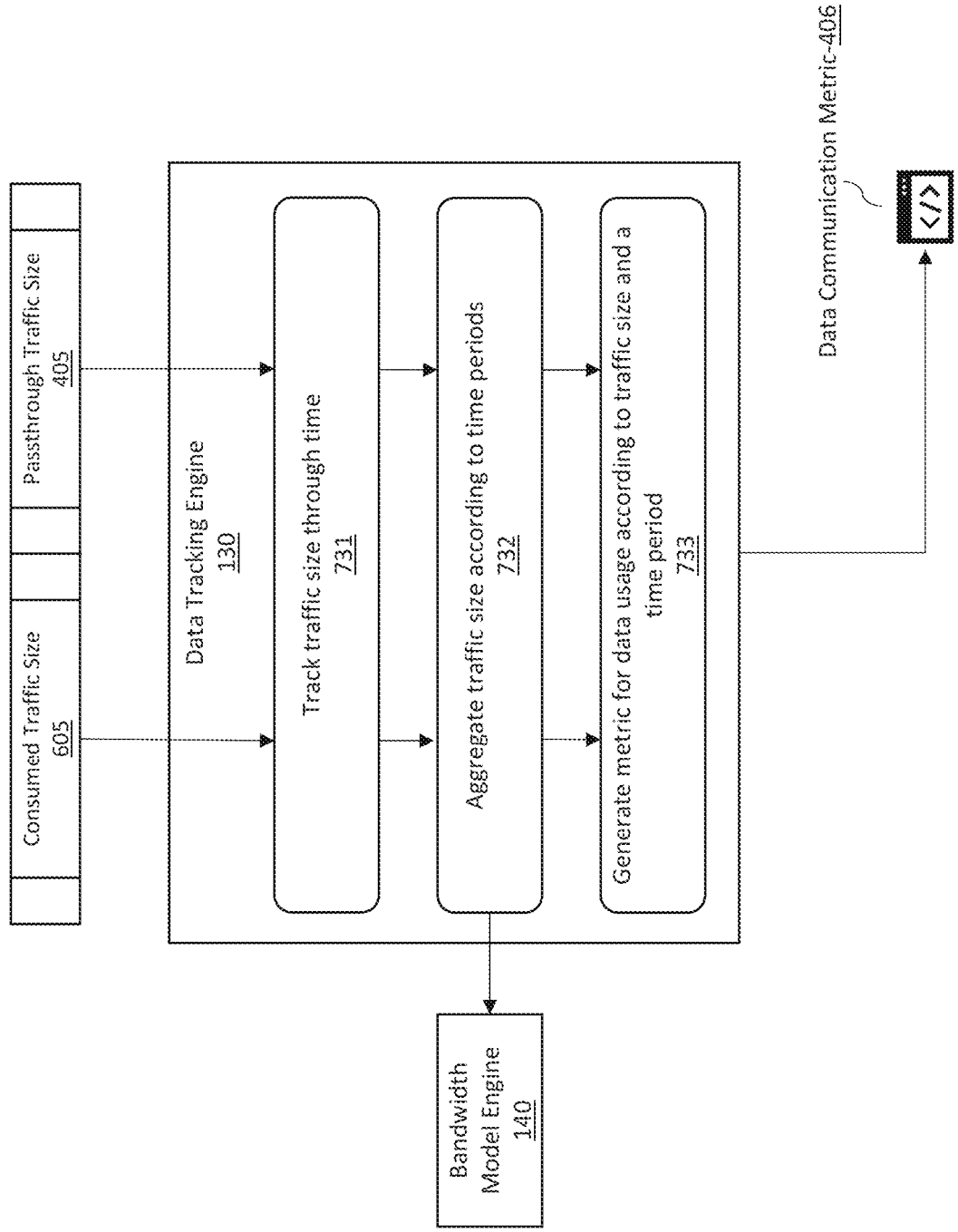
FIG. 7 illustrates a flowchart of an illustrative mesh network packet traffic management methodology that employs an integrated roofing mesh network gateway in accordance with one or more embodiments of the present disclosure.

FIG. 7 illustrates a flowchart of an illustrative packet traffic tracking methodology for bandwidth tracking using the integrated roofing mesh network gateway in accordance with one or more embodiments of the present disclosure.

In some embodiments, the data tracking engine 130 may analyze the consumed traffic size 605 and the passthrough traffic size 405 to determine a data communication metric 406 characterizing the participation of the integrated roofing mesh network gateway 100 in the mesh network 180. Accordingly, in some embodiments, the data tracking engine 130 may track the traffic size of the consumed traffic size 605 and the passthrough traffic size 405 through time at block 731.

In some embodiments, the data traffic and/or data capacity and/or data communication may be measure as bandwidth or by any other suitable measurement. In some embodiments, bandwidth is characterized as data size per time (e.g., bits-per-second or bps). Bandwidth may include, e.g., bps, bits-per-minute, bits-per-hour, bits-per-day, bits-per-week, bits-per-month, bits-per-billing period, or the amount of bits over any other suitable time period. In some embodiments, the billing period may be a predefined length of time (e.g., one month, two months, three months, size months, one year, etc.), or may user selectable based on any suitable billing plan established between the user and a service provider. Alternatively, the service provider may establish the billing period and define bandwidth as data per billing period. In some embodiments, the bandwidth as described above uses bits, however any other measure of data size may be used, such as bytes, kilobits, kilobytes, etc.

Therefore, in some embodiments, by tracking traffic size through time at block 731, the data tracking engine 130 may determine the consumed data capacity and the passthrough data capacity by aggregating the traffic according to the time periods at block 732. For example, in some embodiments, the total or sum of the passthrough traffic size 405 over the course of a billing period of a month may be determined based on the total payload size of all passthrough traffic within the billing period to define the passthrough data capacity. Similarly, for example, in some embodiments, the total or sum of the consumed traffic size 605 over the course of a billing period of a month may be determined based on the total payload size of all consumed traffic within the billing period to define the consumed data capacity. The traffic a size may be aggregated as, e.g., a running total in each time period or may be summed upon each time period elapsing.

In some embodiments, the data tracking engine 130 may provide the passthrough data capacity and/or the consumed data capacity to the data model engine 140 for input to a data communication prediction model. In some embodiments, the data tracking engine 130 may detect and/or receive additional data associated with the passthrough data capacity and/or the consumed data capacity may also be provided, such as, e.g., an identifier of the time period (e.g., range of dates, range of times, communication completion date, communication completion time, communication commencement date, communication commencement time, or any other suitable time period indicator or any combination thereof), a signal strength (e.g., decibel (dB) gain, returned signal strength indicator (RSSI)) of the communication of each data packet, an average signal strength over the time period, a length of the time period, packet latency and a communication success rate, a communication fail rate among other data or any combination thereof. Accordingly, the data model engine 140 may train the data communication prediction model to predict data communication capacity usage, either as consumed data capacity, passthrough data capacity or both according to the time, date, signal strength, data packet headers, payload size, or other feature or any combination thereof.

In some embodiments, the data tracking engine 130 may use the passthrough data capacity and/or the consumed data capacity to determine a metric at block 733 including a data communication metric 406 to characterize the participation of the integrated roofing mesh network gateway 100 in the mesh network 180. In some embodiments, the metric may be, e.g., the passthrough data capacity and/or the consumed data capacity over the course of a time period, a variation of the passthrough data capacity and/or the consumed data capacity of the course of time period (e.g., a variance or standard deviation), an average of the passthrough data capacity and/or the consumed data capacity throughout the time period (e.g., on a per time basis, such as per second, per minute, per hour, per day, etc.) or any other suitable data communication metric 406.

Figure 8:
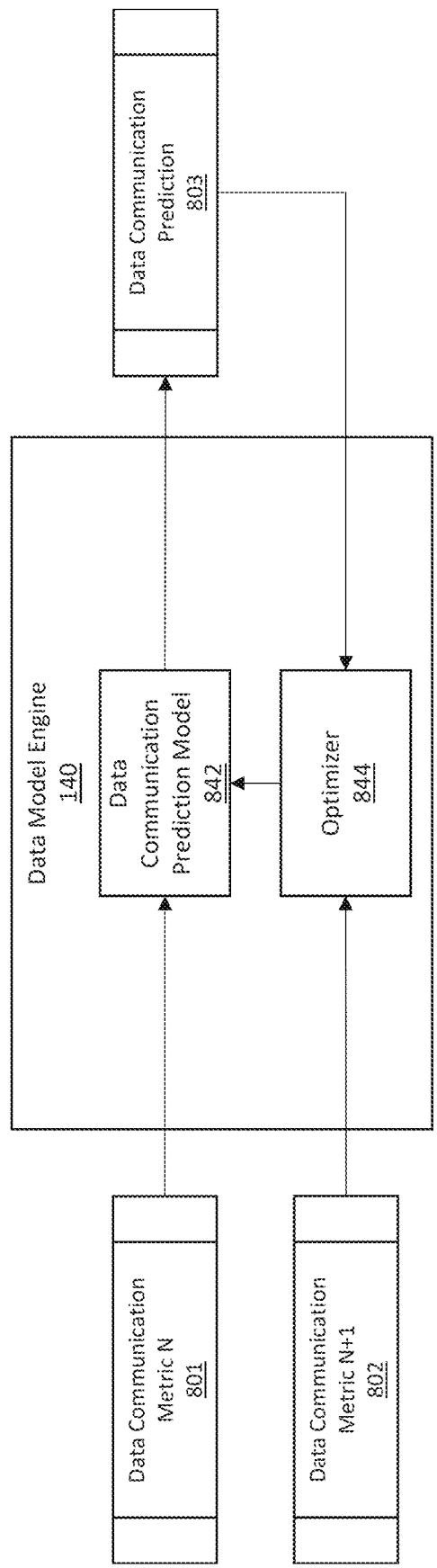
FIG. 8 illustrates a flowchart of an illustrative mesh network management prediction machine learning model that is trained based at least in part on data associated with an integrated roofing mesh network gateway in accordance with one or more embodiments of the present disclosure.

FIG. 8 illustrates a flowchart of an illustrative data communication prediction machine learning model for data communication and capacity tracking using the integrated roofing mesh network gateway in accordance with one or more embodiments of the present disclosure.

In some embodiments, the data model engine 140 may utilize the data communication prediction model 842 to predict a data communication prediction 803 for the data communication metric N 801, e.g., the data communication metric 406 as described above. In some embodiments, the data communication metric N 801 may include a historical data communication metric 406 determined and logged by the data tracking engine 130 as well as additional seasonality and externality data. As a result, the data communication metric N 801 may include a data communication metric 406 for a historical period for which there is a subsequent historical period. In some embodiments, because the data tracking engine 130 determines and logs the data communication metric 406 for each time period, a data communication metric N+1 802 may also be available for a next period of time, such as the subsequent historical period. Thus, a data communication prediction 803 may be produced as an estimate or prediction of the data communication metric for a next period of time relative to the data communication metric N 801 can be compared against the logged data communication metric N+1 802 that has been logged for the same next time period relative to the data communication metric N 801.

In some embodiments, the data communication prediction model 842 ingests the data communication metric N 801 and additional seasonality and externality data, and produces a prediction of a data communication prediction 803 for each data communication metric N 801. In some embodiments, to produce this prediction, the data communication prediction model 842 may include a machine learning model including a regression and/or neural network model, such as, e.g., a recurrent neural network (CNN), linear regression, decision trees, random forest, support vector machine (SVM), K-Nearest Neighbors, or any other suitable algorithm for quantitative prediction.

In some embodiments, upon training the data communication prediction model 842, the data communication prediction model 842 may be used to generate predictions regarding data communication metrics, including future data communication predictions. For example, in some embodiments, the data communication prediction 803 may be a prediction of network load to and/or through a specific node and/or user device. Thus, by training the data communication prediction model 842 with previous usage patterns as quantified by a data communication metric N 801, the data communication prediction model 842 may predict a future network load based on a current data communication metric.

In some embodiments, the data communication metric N 801 may include data regarding external factors, such as heat, humidity, moisture content, weather (e.g., rain, snow, lightning, etc.) or other environmental and/or external factors or any combination thereof. For example, the data communication metric N 801 may include a feature vector encoding the data communication metric with the external factors or other information or any combination thereof. By training the data communication prediction model 842 with historical data communication metrics N 801 including external factors, the data communication prediction model 842 may be sued to predict future network performance at one or more particular nodes based on the external factors.

In some embodiments, the data communication metric N 801 may include time and/or date data (e.g., time of day, day of the week, date, year, season, etc.). For example, the data communication metric N 801 may include a feature vector encoding the data communication metric with the time of day, date, day of the week, or other temporal information or any combination thereof. By training the data communication prediction model 842 with historical data communication metrics N 801 including temporal information, the data communication prediction model 842 may be sued to predict future network performance at one or more particular nodes based on the temporal information.

In some embodiments, the data communication metric N 801 may include event data, such as, e.g., the occurrence of holidays, third-party events, the location of third-party events, commercial activities (e.g., streaming TV show and movie releases, online commerce promotions and sales, video game events, live sports events, etc.), including a time, date and/or location thereof. For example, the data communication metric N 801 may include a feature vector encoding the data communication metric with event data. By training the data communication prediction model 842 with historical data communication metrics N 801 including event data, the data communication prediction model 842 may be sued to predict future network performance at one or more particular nodes based on the event data of one or more expected events.

In some embodiments, the data communication metric N 801 may include node density data, such as a number of nodes in a given area, a number of nodes in communication with a particular node, a number of nodes on the mesh network, or other suitable node density data. The node density data may vary with time, such as, e.g., user devices in an area increasing due to increased traffic or an event. Thus, the node density data may have predictive power for the data communication prediction 803. Thus, the data communication prediction model 842 may be trained based on the node density data. For example, the data communication metric N 801 may include a feature vector encoding the data communication metric with node density data. By training the data communication prediction model 842 with historical data communication metrics N 801 including node density data, the data communication prediction model 842 may be used to predict future network performance at one or more particular nodes based on the node density data.

Accordingly, the data communication prediction model 842 ingests a data communication metric N 801 and processes the attributes encoded therein using the prediction model, such as a neural network, to produce a model output vector. In some embodiments, the model output including the data communication prediction 803 such as, e.g., a next time period data communication metric prediction, a next time period passthrough data capacity usage prediction, a next time period consumed data capacity usage prediction, or other data communication prediction.

In some embodiments, where the data communication prediction 803 includes a prediction of a future data communication metric or other data communication prediction or combination thereof based on the data communication metric N 801. In some embodiments, the data communication prediction 803 may be provided to the computing device 407, e.g., as a prediction of the next time period data communication metric prediction described above. In some embodiments, the data communication prediction 803 of the next time period data communication metric prediction may trigger the computing device 407 to generate an automated instruction and/or recommendation for optimizing network traffic and/or network cost by predictively distributing traffic routing across the mesh network 180 for more evenly distributed traffic routing, data communication capacity addition via node participation, and minimization of total incentives provided to nodes.

In some embodiments, the data communication prediction model 842 may trained based on the data communication prediction 803 and a data communication metric N+1 802 logged for a next historical time period immediately following the historical time period of data communication metric N 801. Based on the difference between the data communication prediction 803 and the data communication metric N+1 802, the parameters of the data communication prediction model 842 may be updated to improve the accuracy of the data communication prediction 803.

In some embodiments, training is performed using the optimizer 844. In some embodiments, the data communication prediction 803 fed back to the optimizer 844. The optimizer 844 may also ingest the data communication metric N+1 802. In some embodiments, in the case of a data communication prediction model 842 include a neural network, support vector machine or similar, the optimizer 844 may employ a loss function, such as, e.g., Hinge Loss, Multi-class SVM Loss, Cross Entropy Loss, Negative Log Likelihood, or other suitable loss function. The loss function determines an error of the data communication prediction 803 based on the data communication metric N+1 802 and the data communication metric N 801. In some embodiments, the optimizer 844 may, e.g., backpropagate the error to the data communication prediction model 842 to update the parameters using, e.g., gradient descent, heuristic, convergence or other optimization techniques and combinations thereof.

In some embodiments, the optimizer 844 may therefore train the parameters of the data communication prediction model 842 in an unsupervised fashion to approximate bandwidth usage patterns based on historical data communication metrics.

Figure 9:
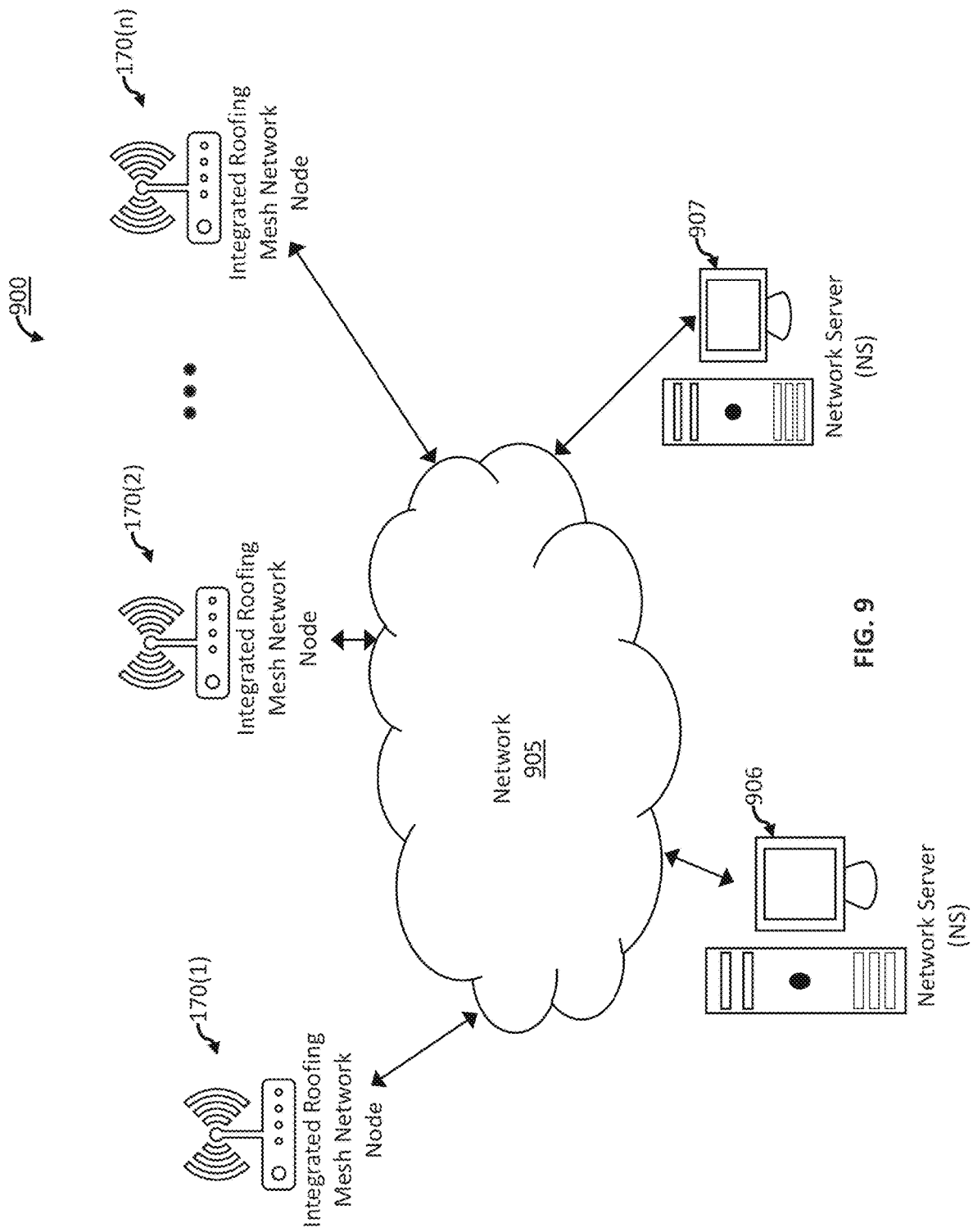
FIG. 9 depicts a block diagram of an mesh network management computer-based system/platform that employs an integrated roofing mesh network gateway in accordance with one or more embodiments of the present disclosure.

FIG. 9 depicts a block diagram of an computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the computer-based system and platform 900 may be configured to manage a large number of members and concurrent transactions, as detailed herein. In some embodiments, the computer-based system and platform 900 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 9, an integrated roofing mesh network node 170(1), integrated roofing mesh network node 170(2) through integrated roofing mesh network node 170(n) of the computer-based system and platform 900 may include virtually any computing device capable of receiving and sending a message over a mesh network (e.g., cloud network), such as network 905, to and from another computing device, such as servers 906 and 907, each other, and the like. In some embodiments, the integrated roofing mesh network nodes 170(1) through 170(n) may include personal computers, multiprocessor systems, microprocessor-based or programmable consumer electronics, network PCs, and the like. In some embodiments, one or more of the integrated roofing mesh network nodes 170(1) through 170(n) may include integrated roofing mesh network gateways 100, mesh network radios 105, computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more of the integrated roofing mesh network nodes 170(1) through 170(n) may include devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, CBRS, LoRa, etc.). In some embodiments, one or more of the integrated roofing mesh network nodes 170(1) through 170(n) may include one or more devices and/or components that may run one or more applications, such as Internet browsers, mobile applications, voice calls, video games, videoconferencing, and email, among others. In some embodiments, one or more of the integrated roofing mesh network nodes 170(1) through 170(n) may include one or more devices and/or components configured to receive and to send web pages, and the like. In some embodiments, an specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, one or more of the integrated roofing mesh network nodes 170(1) through 170(n) may include one or more devices and/or components specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, one or more of the integrated roofing mesh network nodes 170(1) through 170(n) may periodically report status or send alerts over text or email. In some embodiments, one or more of the integrated roofing mesh network nodes 170(1) through 170(n) may include a data recorder which is remotely downloadable by the user using network protocols such as FTP, SSH, or other file transfer mechanisms. In some embodiments, one or more of the integrated roofing mesh network nodes 170(1) through 170(n) may provide several levels of user interface, for example, advance user, standard user. In some embodiments, one or more of the integrated roofing mesh network nodes 170(1) through 170(n) may include one or more devices and/or components specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the network 905 may provide network access, data transport and/or other services to any computing device coupled to it. In some embodiments, the network 905 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 905 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 905 may include and implement, as an alternative or in conjunction with one or more of the above, a WiMAX architecture defined by the WiMAX forum. In some embodiments and, optionally, in combination of any embodiment described above or below, the network 905 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 905 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the network 905 may also include mass storage, such as network attached storage (NAS), a storage area network (SAN), a content delivery network (CDN) or other forms of computer or machine readable media.

In some embodiments, the server 906 or the server 907 may be a web server (or a series of servers) running a network operating system, examples of which may include but are not limited to Apache on Linux or Microsoft IIS (Internet Information Services). In some embodiments, the server 906 or the server 907 may be used for and/or provide cloud and/or network computing, containerized applications, headless applications, virtual machine functionality, etc. Although not shown in FIG. 9, in some embodiments, the server 906 or the server 907 may have connections to external systems like email, SMS messaging, text messaging, ad content providers, etc. Any of the features of the server 906 may be also implemented in the server 907 and vice versa.

In some embodiments, one or more of the servers 906 and 907 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the integrated roofing mesh network nodes 170(1) through 170(n).

In some embodiments and, optionally, in combination of any embodiment described above or below, for example, one or more computing member devices 902-904, the server 906, and/or the server 907 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 10:
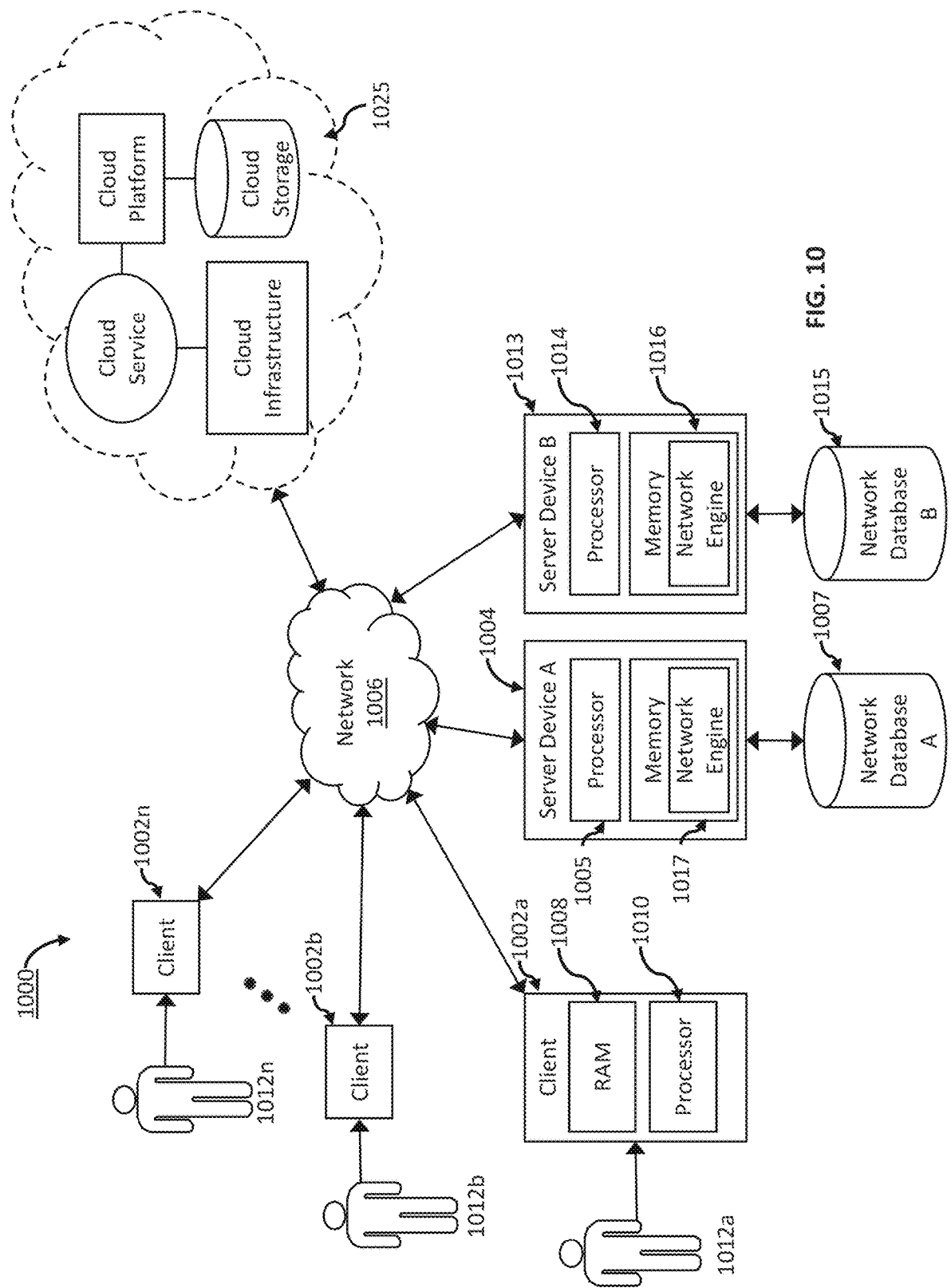
FIG. 10 depicts a block diagram of another mesh network management computer-based system/platform that employs an integrated roofing mesh network gateway in accordance with one or more embodiments of the present disclosure.

FIG. 10 depicts a block diagram of another computer-based system and platform 1000 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 1002a, member computing device 1002b through member computing device 1002n shown each at least includes a computer-readable medium, such as a random-access memory (RAM) 1008 coupled to a processor 1010 or FLASH memory. In some embodiments, the processor 1010 may execute computer-executable program instructions stored in memory 1008. In some embodiments, the processor 1010 may include a microprocessor, an ASIC, and/or a state machine. In some embodiments, the processor 1010 may include, or may be in communication with, media, for example computer-readable media, which stores instructions that, when executed by the processor 1010, may cause the processor 1010 to perform one or more steps described herein. In some embodiments, examples of computer-readable media may include, but are not limited to, an electronic, optical, magnetic, or other storage or transmission device capable of providing a processor, such as the processor 1010 of member computing device 1002a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 1002a through 1002n may also comprise a number of external or internal devices such as a mouse, a CD-ROM, DVD, a physical or virtual keyboard, a display, or other input or output devices. In some embodiments, examples of member computing devices 1002a through 1002n (e.g., clients) may be any type of processor-based platforms that are connected to a network 1006 such as, without limitation, personal computers, digital assistants, personal digital assistants, smart phones, pagers, digital tablets, laptop computers, Internet appliances, and other processor-based devices. In some embodiments, member computing devices 1002a through 1002n may be specifically programmed with one or more application programs in accordance with one or more principles/methodologies detailed herein. In some embodiments, member computing devices 1002a through 1002n may operate on any operating system capable of supporting a browser or browser-enabled application, such as Microsoft™, Windows™, and/or Linux. In some embodiments, member computing devices 1002a through 1002n shown may include, for example, personal computers executing a browser application program such as Microsoft Corporation's Internet Explorer™, Apple Computer, Inc.'s Safari™, Mozilla Firefox, and/or Opera.

In some embodiments, through the member computing client devices 1002a through 1002n, user 1012a, user 1012b through user 1012n, may communicate over the network 1006 with each other and/or with other systems and/or devices coupled to the network 1006 using one or more integrated roofing mesh network nodes, such as the integrated roofing mesh network nodes 170(1) through 170(n) described above. As shown in FIG. 10, server devices 1004 and 1013 may include processor 1005 and processor 1014, respectively, as well as memory 1017 and memory 1016, respectively. In some embodiments, the server devices 1004 and 1013 may be also coupled to the network 1006. In some embodiments, one or more member computing devices 1002a through 1002n may be mobile clients.

In some embodiments, at least one database of databases 1007 and 1015 may be any type of database, including a database managed by a database management system (DBMS). In some embodiments, an DBMS-managed database may be specifically programmed as an engine that controls organization, storage, management, and/or retrieval of data in the respective database. In some embodiments, the DBMS-managed database may be specifically programmed to provide the ability to query, backup and replicate, enforce rules, provide security, compute, perform change and access logging, and/or automate optimization. In some embodiments, the DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the DBMS-managed database may be specifically programmed to define each respective schema of each database in the DBMS, according to a particular database model of the present disclosure which may include a hierarchical model, network model, relational model, object model, or some other suitable organization that may result in one or more applicable data structures that may include fields, records, files, and/or objects. In some embodiments, the DBMS-managed database may be specifically programmed to include metadata about the data that is stored.

Figure 11:
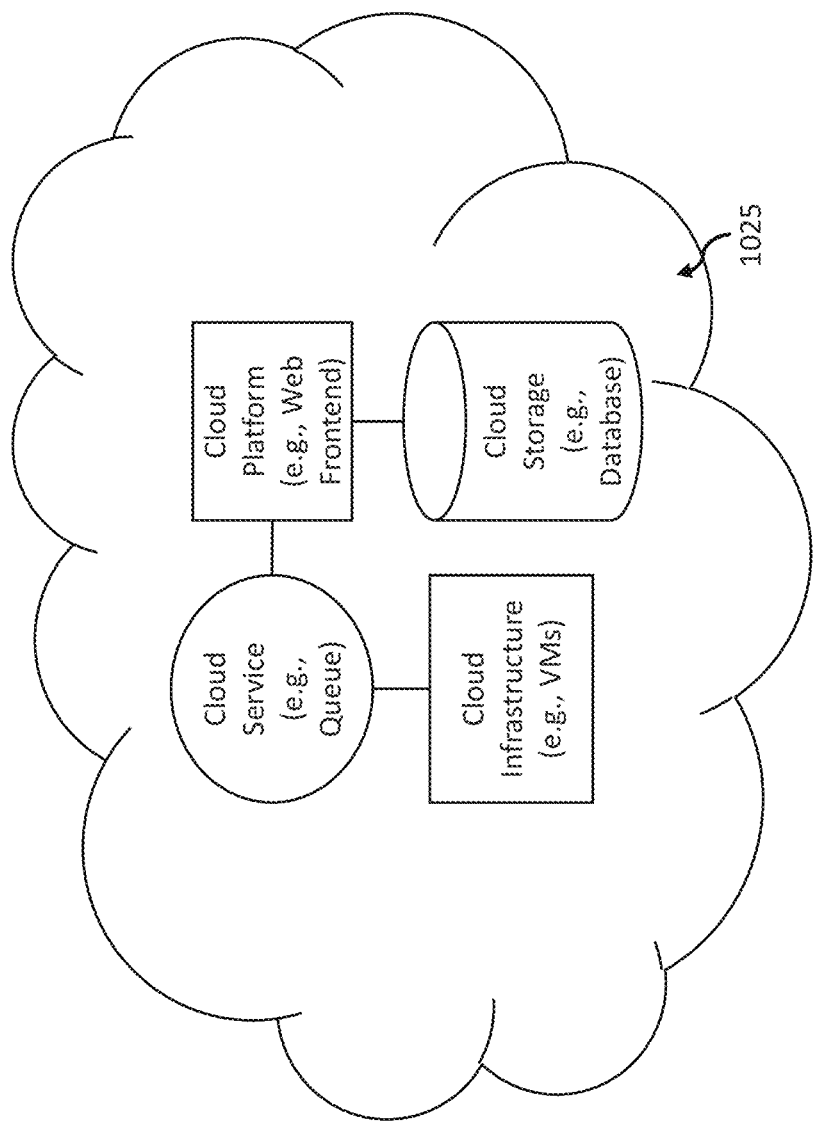
FIG. 11 depicts an illustrative diagram of an implementation of a cloud computing architecture of an computer-based system that employs an integrated roofing mesh network gateway in accordance with some embodiments of the present disclosure.
Figure 12:
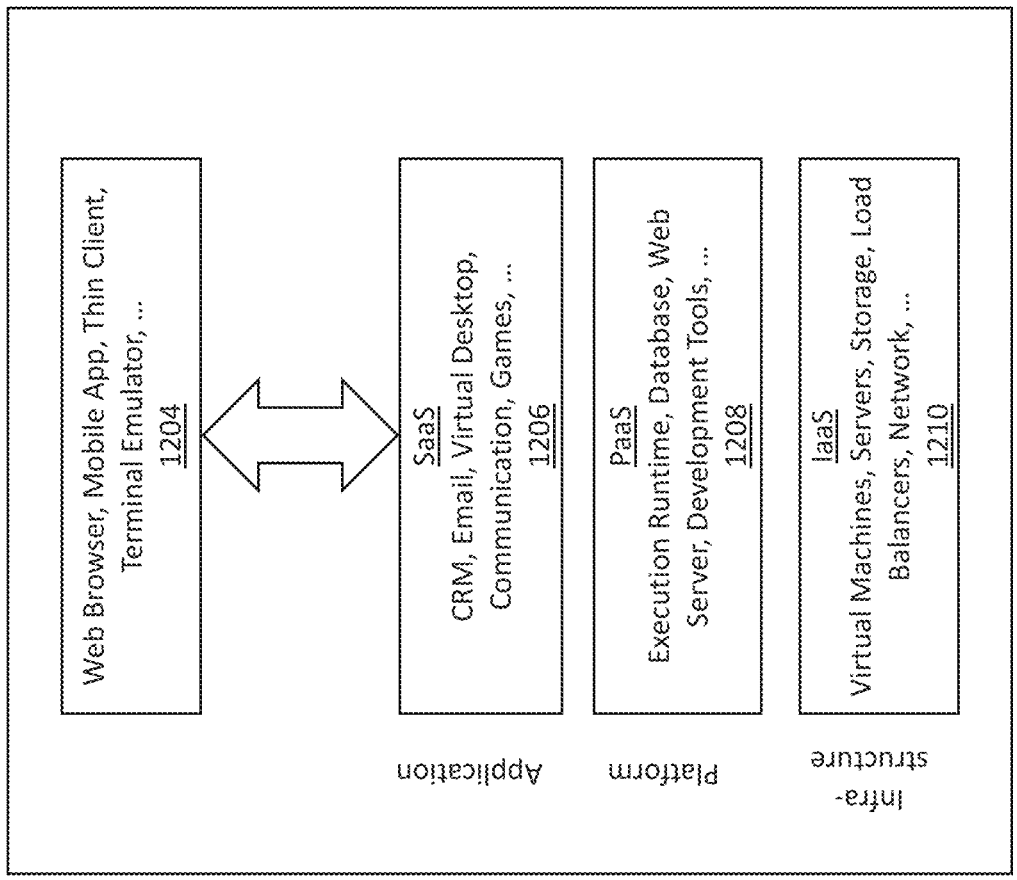
FIG. 12 depicts an illustrative diagram of another implementation of a cloud computing architecture of a mesh network management computer-based system that employs an integrated roofing mesh network gateway in accordance with some embodiments of the present disclosure.

In some embodiments, the inventive computer-based systems/platforms, the inventive computer-based devices, and/or the inventive computer-based components of the present disclosure may be specifically configured to operate in a cloud computing architecture 1025 such as, but not limiting to: infrastructure a service (IaaS) 1210, platform as a service (PaaS) 1208, and/or software as a service (SaaS) 1206 using a web browser, mobile app, thin client, terminal emulator or other endpoint 1204. In such a cloud computing architecture 1025, functionality and/or software components of the integrated roofing mesh network gateway 100, such as for the packet routing engine 110, the packet tracking engine 120, the data tracking engine 130, the data model engine 140, the data management engine 150, among other computer engines and functions, may be provided as a software service provided by the cloud computing architecture 1025, e.g., using the SaaS 1206 layer. Accordingly, in some embodiments, the integrated roofing mesh network gateway 100 may send records of inbound and outbound data packets, data packet addresses, data packet payload sizes, or other data or any combination thereof to the cloud computing architecture 1025. The cloud computing architecture 1025 may instantiate one or more of the packet routing engine 110, the packet tracking engine 120, the data tracking engine 130, the data model engine 140, and the data management engine 150 as a cloud service to provide the functionality for determine a data communication metric, predicted data communication metric, data communication management scheme, or any combination thereof to the integrated roofing mesh network node 170. FIGS. 11 and 12 illustrate schematics of implementations of the cloud computing/architecture(s) in which the inventive computer-based systems/platforms, the inventive computer-based devices, and/or the inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the mesh network described herein may include any suitable distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method comprising:
    receiving, by a processor of a gateway of an integrated roofing mesh network node in a mesh network of other nodes, a plurality of received data packets from the mesh network;
    transmitting, by the processor, a plurality of transmitted data packets to the mesh network;
        wherein each data packet of the plurality of received data packets and the plurality of transmitted data packets comprises:
            i) a source address of a sending node,
            ii) a destination address of a receiving node, and
            iii) a payload of data;
    comparing, by the processor, the source address and the destination address of each data packet with an address associated with the gateway;
    determining, by the processor, passthrough traffic based at least in part on:
        i) the address associated with the gateway, and
        ii) the source address and the destination address of each data packet;
        wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet;
    determining, by the processor, a passthrough data capacity based at least in part on the payload of data of each data packet in the subset;
    determining, by the processor, a metric based at least in part on the passthrough data capacity; and
    communicating, by the processor, the metric to service provider to notify the service provider of an amount of mesh network bandwidth provided by the passthrough data capacity of the integrated roofing mesh network node.

2. A system comprising:
  a gateway of an integrated roofing mesh network node in communication with a mesh network of other nodes;
  wherein the gateway comprises a processor configured to execute software instructions that cause the processor to perform steps to:
    receive a plurality of received data packets from the mesh network;
    transmit a plurality of transmitted data packets to the mesh network;
      wherein each data packet of the plurality of received data packets and the plurality of transmitted data packets comprises:
        i) a source address of a sending node,
        ii) a destination address of a receiving node, and
        iii) a payload of data;
    compare the source address and the destination address of each data packet with an address associated with the gateway;
    determine passthrough traffic based at least in part on:
      i) the address associated with the gateway, and
      ii) the source address and the destination address of each data packet;
      wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet;
    determine a passthrough data capacity based at least in part on the payload of data of each data packet in the subset;
    determine a metric based at least in part on the passthrough data capacity; and
    communicate the metric to service provider to notify the service provider of an amount of mesh network bandwidth provided by the passthrough data capacity of the integrated roofing mesh network node.
3. A method comprising:
  receiving, by a processor of a gateway of an integrated roofing mesh network node in a mesh network of other nodes, a data packet associated with the mesh network;
    wherein the data packet comprises:
      i) a header specifying:
        a virtual mesh network identifier identifying a virtual mesh network operating as a tenant of the mesh network,
        a source address of a sending node, and
        a destination address of a receiving node, and
      iii) a payload of data;
    identifying, by the processor, the data packet as passthrough traffic based at least in part on:
      i) the address associated with the gateway, and
      ii) the address and the destination address of the data packet;
      wherein the passthrough traffic comprises data traffic that is routed between two or more radio nodes of the mesh network through the gateway of the integrated roofing mesh network node based at least in part on the source address and the destination address of the data packet;
    determining, by the processor, a passthrough data capacity based at least in part on the payload of data of the data packet;
    determining, by the processor, a service provider of the mesh network based at least in part on the virtual mesh network identifier;
    determining, by the processor, a service provider-specific metric based at least in part on the passthrough data capacity and the service provider of the mesh network; and
    communicating, by the processor, the metric to the service provider to notify the service provider of an amount of mesh network bandwidth provided by the passthrough data capacity of the integrated roofing mesh network node.
4. The systems and/or methods as recited in any of clauses 1 through 3, further comprising:
  determining, by the processor, consumed traffic based at least in part on:
    i) the address associated with the processor, and
    ii) the source address and the destination address of each data packet;
    wherein the consumed traffic comprises a second subset of the plurality of received data packets and the plurality of the transmitted data packets that is routed between the integrated roofing mesh network node and radio node of the mesh network based at least in part on the source address and the destination address of each data packet;
  determining, by the processor, a consumed data capacity based at least in part on the payload of data of each data packet in the second subset; and
  determining, by the processor, the metric based at least in part on the passthrough data capacity and the consumed data capacity.
5. The systems and/or methods as recited in clause 4, wherein the metric comprises a ratio of the passthrough data capacity to the consumed data capacity.
6. The systems and/or methods as recited in any of clauses 1 through 3, further comprising determining, by the processor, a size of the payload of data of each data packet in the subset.
7. The systems and/or methods as recited in clause 6, wherein the passthrough data capacity comprises a sum of the size of the payload of data of each data packet in the subset over a first period of time.
8. The systems and/or methods as recited in any of clauses 1 through 3, further comprising:
  determining, by the processor, a data communication prioritization parameter based at least in part on the passthrough data capacity;
    wherein the data communication prioritization parameter comprises relative priority of communication of the passthrough data traffic and non-passthrough data traffic; and
  instructing, by the processor, the gateway to prioritize communication of a plurality of future received data packets and a plurality of future transmitted data packets based at least in part on the data communication prioritization parameter.
9. The systems and/or methods as recited in any of clauses 1 through 3, further comprising:
  determining, by the processor, a tenant mesh network associated with each data packet in the subset;
    wherein the mesh network of radio nodes comprises a physical infrastructure layer;
    wherein a service layer utilizes the physical infrastructure layer for data service, the service layer comprising a plurality of tenant mesh networks sharing the mesh network of the physical infrastructure layer;

determining, by the processor, the passthrough data capacity associated with the tenant mesh network based at least in part on the payload of data of each data packet associated with the tenant mesh network in the subset;

determining, by the processor, tenant-specific metric based at least in part on the passthrough data capacity; and communicating, by the processor, the tenant-specific metric to a service provider associated with the tenant mesh network.

10. The systems and/or methods as recited in any of clauses 1 through 3, further comprising:

detecting, by the processor, a signal strength of the integrated roofing mesh network node with each radio node of the mesh network; and utilizing, by the processor, a data communication prediction machine learning model to estimate a consumed data capacity for a next period of time;

wherein the consumed data capacity comprises a second subset of the plurality of received data packets and the plurality of the transmitted data packets that is routed between the integrated roofing mesh network node and radio node of the mesh network based at least in part on the source address and the destination address of each data packet.

11. The systems and/or methods as recited in clause 10, wherein the mesh network comprises a fifth generation cellular (5G) network, the integrated roofing mesh network node comprises an integrated 5G radio.

12. The systems and/or methods as recited in any of clauses 1 through 3, wherein the mesh network comprises a physical infrastructure layer comprising of the integrated roofing mesh network node and the other nodes;

wherein the mesh network comprises a multi-tenancy virtual network layer having a plurality of virtual mesh networks.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:

receiving, by a processor of a gateway of an integrated roofing mesh network node in a mesh network of other nodes, a plurality of received data packets from the mesh network;

transmitting, by the processor, a plurality of transmitted data packets to the mesh network;

wherein each data packet of the plurality of received data packets and the plurality of transmitted data packets comprises:

i) a source address of a sending node,
ii) a destination address of a receiving node, and
iii) a payload of data;

comparing, by the processor, the source address and the destination address of each data packet with an address associated with the gateway;

controlling, by the processor, the gateway to devote a predetermined percentage of bandwidth to passthrough traffic so as to enable additional integrated roofing accessories to connect the internet;

determining, by the processor, passthrough traffic based at least in part on:

i) the address associated with the gateway, and
ii) the source address and the destination address of each data packet;

wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet;

determining, by the processor, a passthrough data capacity based at least in part on the payload of data of each data packet in the subset;

determining, by the processor, a metric based at least in part on the passthrough data capacity; and communicating, by the processor, the metric to service provider to notify the service provider of an amount of mesh network bandwidth provided by the passthrough data capacity of the integrated roofing mesh network node.

2. The method of claim 1, further comprising:

determining, by the processor, consumed traffic based at least in part on:

i) the address associated with the processor, and
ii) the source address and the destination address of each data packet;

wherein the consumed traffic comprises a second subset of the plurality of received data packets and the plurality of the transmitted data packets that is routed between the integrated roofing mesh network node and radio node of the mesh network based at least in part on the source address and the destination address of each data packet;

determining, by the processor, a consumed data capacity based at least in part on the payload of data of each data packet in the second subset; and determining, by the processor, the metric based at least in part on the passthrough data capacity and the consumed data capacity.

3. The method of claim 2, wherein the metric comprises a ratio of the passthrough data capacity to the consumed data capacity.

4. The method of claim 1, further comprising determining, by the processor, a size of the payload of data of each data packet in the subset.

5. The method of claim 4, wherein the passthrough data capacity comprises a sum of the size of the payload of data of each data packet in the subset over a first period of time.

6. The method of claim 1, further comprising:

determining, by the processor, a data communication prioritization parameter based at least in part on the passthrough data capacity;

wherein the data communication prioritization parameter comprises relative priority of communication of the passthrough data traffic and non-passthrough data traffic; and instructing, by the processor, the gateway to prioritize communication of a plurality of future received data packets and a plurality of future transmitted data packets based at least in part on the data communication prioritization parameter.

7. The method of claim 1, further comprising:
determining, by the processor, a tenant mesh network associated with each data packet in the subset;
    wherein the mesh network of radio nodes comprises a physical infrastructure layer;
    wherein a service layer utilizes the physical infrastructure layer for data service, the service layer comprising a plurality of tenant mesh networks sharing the mesh network of the physical infrastructure layer;
determining, by the processor, the passthrough data capacity associated with the tenant mesh network based at least in part on the payload of data of each data packet associated with the tenant mesh network in the subset;
determining, by the processor, tenant-specific metric based at least in part on the passthrough data capacity; and
communicating, by the processor, the tenant-specific metric to a service provider associated with the tenant mesh network.

8. The method of claim 1, further comprising:
detecting, by the processor, a signal strength of the integrated roofing mesh network node with each radio node of the mesh network; and
utilizing, by the processor, a data communication prediction machine learning model to estimate a consumed data capacity for a next period of time;
    wherein the consumed data capacity comprises a second subset of the plurality of received data packets and the plurality of transmitted data packets that is routed between the integrated roofing mesh network node and radio node of the mesh network based at least in part on the source address and the destination address of each data packet.

9. The method of claim 8, wherein the mesh network comprises a wireless network, the integrated roofing mesh network node comprises a wireless networking radio.

10. A system comprising:
a gateway of an integrated roofing mesh network node in communication with a mesh network of other nodes;
wherein the gateway comprises a processor configured to execute software instructions that cause the processor to perform steps to:
    receive a plurality of received data packets from the mesh network;
    transmit a plurality of transmitted data packets to the mesh network;
        wherein each data packet of the plurality of received data packets and the plurality of transmitted data packets comprises:
            i) a source address of a sending node,
            ii) a destination address of a receiving node, and
            iii) a payload of data;
    compare the source address and the destination address of each data packet with an address associated with the gateway;
    control the gateway to devote a predetermined percentage of bandwidth to passthrough traffic so as to enable additional integrated roofing accessories to connect the internet;
    determine passthrough traffic based at least in part on:
        i) the address associated with the gateway, and
        ii) the source address and the destination address of each data packet;
        wherein the passthrough traffic comprises a subset of the plurality of received data packets and the plurality of the transmitted data packets that is routed between two or more radio nodes of the mesh network through the gateway of the integrated roofing mesh network node based at least in part on the source address and the destination address of each data packet;
    determine a passthrough data capacity based at least in part on the payload of data of each data packet in the subset;
    determine a metric based at least in part on the passthrough data capacity; and
    communicate the metric to service provider to notify the service provider of an amount of mesh network bandwidth provided by the passthrough data capacity of the integrated roofing mesh network node.

11. The system of claim 10, wherein the processor is further configured to execute software instructions that cause the processor to perform steps to:
    determine consumed traffic based at least in part on:
        i) the address associated with the gateway, and
        ii) the source address and the destination address of each data packet;
        wherein the consumed traffic comprises a second subset of the plurality of received data packets and the plurality of the transmitted data packets that is routed between the integrated roofing mesh network node and radio node of the mesh network based at least in part on the source address and the destination address of each data packet;
    determine a consumed data capacity based at least in part on the payload of data of each data packet in the second subset; and
    determine the metric based at least in part on the passthrough data capacity and the consumed data capacity.

12. The system of claim 11, wherein the metric comprises a ratio of the passthrough data capacity to the consumed data capacity.

13. The system of claim 11, wherein the processor is further configured to execute software instructions that cause the processor to perform steps to determining, by the gateway, a size of the payload of data of each data packet in the subset.

14. The system of claim 13, wherein the passthrough data capacity comprises a sum of the size of the payload of data of each data packet in the subset over a first period of time.

15. The system of claim 14, wherein the processor is further configured to execute software instructions that cause the processor to perform steps to:
    determine a data communication prioritization parameter based at least in part on the passthrough data capacity;
        wherein the data communication prioritization parameter comprises relative priority of communication of the passthrough data traffic and non-passthrough data traffic; and
    instruct the gateway to prioritize communication of a plurality of future received data packets and a plurality of future transmitted data packets based at least in part on the data communication prioritization parameter.

16. The system of claim 10, wherein the processor is further configured to execute software instructions that cause the processor to perform steps to:
    determine a tenant mesh network associated with each data packet in the subset;
        wherein the mesh network of radio nodes comprises a physical infrastructure layer;

wherein a service layer utilizes the physical infrastructure layer for data service, the service layer comprising a plurality of tenant mesh networks sharing the mesh network of the physical infrastructure layer;

determine the passthrough data capacity associated with the tenant mesh network based at least in part on the payload of data of each data packet associated with the tenant mesh network in the subset;

determine tenant-specific metric based at least in part on the passthrough data capacity; and communicate the tenant-specific metric to service provider associated with the tenant mesh network.

17. The system of claim 10, wherein the processor is further configured to execute software instructions that cause the processor to perform steps to:

detect a signal strength of the integrated roofing mesh network node with each radio node of the mesh network; and utilize a data communication prediction machine learning model to estimate a consumed data capacity for a next period of time;

wherein the consumed data capacity comprises a second subset of the plurality of received data packets and the plurality of the transmitted data packets that is routed between the integrated roofing mesh network node and radio node of the mesh network based at least in part on the source address and the destination address of each data packet.

18. The system of claim 17, wherein the mesh network comprises a wireless network, the integrated roofing mesh network node comprises wireless networking radio.

19. A method comprising:

receiving, by a processor of a gateway of an integrated roofing mesh network node in a mesh network of other nodes, a data packet associated with the mesh network;

wherein the data packet comprises:

i) a header specifying:

a virtual mesh network identifier identifying a virtual mesh network operating as a tenant of the mesh network, a source address of a sending node, and a destination address of a receiving node, and iii) a payload of data;

identifying, by the processor, the data packet as passthrough traffic based at least in part on:

i) the address associated with the gateway, and ii) the address and the destination address of the data packet;

wherein the passthrough traffic comprises data traffic that is routed between two or more radio nodes of the mesh network through the gateway of the integrated roofing mesh network node based at least in part on the source address and the destination address of the data packet;

determining, by the processor, a passthrough data capacity based at least in part on the payload of data of the data packet;

controlling, by the processor, the gateway to devote a predetermined percentage of bandwidth to passthrough traffic so as to enable additional integrated roofing accessories to connect the internet;

determining, by the processor, a service provider of the mesh network based at least in part on the virtual mesh network identifier;

determining, by the processor, a service provider-specific metric based at least in part on the passthrough data capacity and the service provider of the mesh network; and communicating, by the processor, the metric to the service provider to notify the service provider of an amount of mesh network bandwidth provided by the passthrough data capacity of the integrated roofing mesh network node.

20. The method of claim 19, wherein the mesh network comprises a physical infrastructure layer comprising of the integrated roofing mesh network node and the other nodes;

wherein the mesh network comprises a multi-tenancy virtual network layer having a plurality of virtual mesh networks.

* * * * *